United States Patent
Liu et al.

(10) Patent No.: US 12,511,901 B2
(45) Date of Patent: *Dec. 30, 2025

(54) WIRELESS TRANSMISSION SYSTEM AND TRANSMITTING CONTROL DEVICE

(71) Applicant: SHENZHEN HOLLYLAND TECHNOLOGY CO., LTD., Guangdong (CN)

(72) Inventors: Dezhi Liu, Guangdong (CN); Qiang Ma, Guangdong (CN)

(73) Assignee: Shenzhen Hollyland Technology Co., Ltd., Shenzhen (CN)

(*) Notice: Subject to any disclaimer, the term of this patent is extended or adjusted under 35 U.S.C. 154(b) by 679 days.

This patent is subject to a terminal disclaimer.

(21) Appl. No.: 17/799,448

(22) PCT Filed: Mar. 14, 2020

(86) PCT No.: PCT/CN2020/079407
§ 371 (c)(1),
(2) Date: Aug. 12, 2022

(87) PCT Pub. No.: WO2021/164081
PCT Pub. Date: Aug. 26, 2021

(65) Prior Publication Data
US 2023/0169767 A1    Jun. 1, 2023

Related U.S. Application Data

(60) Provisional application No. 62/979,176, filed on Feb. 20, 2020.

(51) Int. Cl.
*G06V 20/40* (2022.01)
*G03B 17/56* (2021.01)
(Continued)

(52) U.S. Cl.
CPC .......... *G06V 20/46* (2022.01); *G03B 17/561* (2013.01); *H04N 23/61* (2023.01); *H04N 23/64* (2023.01);
(Continued)

(58) Field of Classification Search
CPC .... G06V 20/46; G06V 2201/07; G06V 10/62; G03B 17/561; H04N 23/61; H04N 23/64;
(Continued)

(56) References Cited

U.S. PATENT DOCUMENTS

| | | |
|---|---|---|
| 8,477,227 B2 | 7/2013 | Hio |
| 9,888,214 B2 | 2/2018 | Bateman et al. |

(Continued)

FOREIGN PATENT DOCUMENTS

| | | |
|---|---|---|
| CN | 201976193 | 9/2011 |
| CN | 104349100 | 2/2015 |

(Continued)

OTHER PUBLICATIONS

Office Action in Chinese Appln. No. 202010178596.X, dated Dec. 19, 2023, 24 pages (with English machine translation).

(Continued)

*Primary Examiner* — Stephen P Coleman
(74) *Attorney, Agent, or Firm* — Fish & Richardson P.C.

(57) ABSTRACT

Methods, devices, apparatus, and systems for wireless transmission and transmitting control are provided. In one aspect, a transmitting control device in a wireless transmission system is connected to an external video acquisition device such that video data acquired by the video acquisition device is obtained. According to an associated identification of a photographed object and the video data, video parameters of the photographed object are determined, and tracked and analyzed. According to an analysis result, a control instruction is generated to control the video acquisition device to (Continued)

acquire the video data, and the video data is transmitted to a receiving control device in the wireless transmission system. The receiving control device is configured to determine the associated identification of the photographed object, send the associated identification to the transmitting control device, and output the video data transmitted by the transmitting control device.

18 Claims, 6 Drawing Sheets

(51) Int. Cl.
*H04N 23/60* (2023.01)
*H04N 23/61* (2023.01)
*H04N 23/695* (2023.01)
*H04N 23/951* (2023.01)

(52) U.S. Cl.
CPC ......... *H04N 23/695* (2023.01); *H04N 23/951* (2023.01); *G06V 2201/07* (2022.01)

(58) Field of Classification Search
CPC .... H04N 23/695; H04N 23/951; H04N 23/60; H04N 23/661; H04N 23/69; H04N 23/75; H04N 7/18
USPC ........................................................ 382/103
See application file for complete search history.

(56) References Cited

U.S. PATENT DOCUMENTS

| | | | |
|---|---|---|---|
| 10,595,008 | B2 | 3/2020 | Roine et al. |
| 10,880,464 | B1 | 12/2020 | Kim et al. |
| 2010/0142914 | A1 | 6/2010 | Zhao |
| 2010/0195870 | A1 | 8/2010 | Ai et al. |
| 2010/0229452 | A1 | 9/2010 | Suk |
| 2012/0183039 | A1* | 7/2012 | Rajamani ............. H04N 19/124 375/E7.026 |
| 2013/0088592 | A1 | 4/2013 | Falomkin et al. |
| 2015/0029347 | A1 | 1/2015 | Tsubusaki |
| 2015/0124084 | A1 | 5/2015 | Ikenoue |
| 2016/0307332 | A1 | 10/2016 | Ranjan et al. |
| 2017/0323458 | A1 | 11/2017 | Lablans |
| 2018/0255233 | A1 | 9/2018 | Shibata et al. |
| 2018/0324410 | A1 | 11/2018 | Roine et al. |
| 2019/0320117 | A1 | 10/2019 | Wu et al. |
| 2020/0104598 | A1 | 4/2020 | Qian et al. |
| 2021/0158051 | A1 | 5/2021 | Dalal et al. |
| 2021/0258496 | A1* | 8/2021 | Yoshida ............... H04N 21/431 |
| 2021/0334547 | A1 | 10/2021 | Cohen-Tidhar et al. |
| 2022/0277642 | A1 | 9/2022 | Fukushima et al. |
| 2022/0337787 | A1 | 10/2022 | Chang et al. |
| 2023/0056334 | A1 | 2/2023 | Liu et al. |

FOREIGN PATENT DOCUMENTS

| | | |
|---|---|---|
| CN | 104394363 | 3/2015 |
| CN | 104519257 | 4/2015 |
| CN | 104702892 A | 6/2015 |
| CN | 105338248 | 2/2016 |
| CN | 105407283 A | 3/2016 |
| CN | 106303374 A | 1/2017 |
| CN | 107197165 A | 9/2017 |
| CN | 107736019 | 2/2018 |
| CN | 107977988 | 5/2018 |
| CN | 108476288 A | 8/2018 |
| CN | 109074629 A | 12/2018 |
| CN | 109218665 A | 1/2019 |
| CN | 109391775 A | 2/2019 |
| CN | 109982029 A | 7/2019 |
| CN | 110418112 A | 11/2019 |
| CN | 110493512 A | 11/2019 |

OTHER PUBLICATIONS

Office Action in Chinese Appln. No. 202010181036.X, dated Feb. 29, 2024, 23 pages (with English machine translation).
Office Action in Chinese Appln. No. 202010178596X, dated Jul. 8, 2023, 22 pages (with Machine Translation).
Office Action in Chinese Appln. No. 202010181036X, dated Oct. 11, 2023, 21 pages (with Machine Translation).
Office Action in Chinese Appln. No. 202010178596.X, dated Oct. 28, 2022, 21 pages (with English translation).
Office Action in Chinese Appln. No. 202010181036X, mailed on May 11, 2024, 19 pages (with Machine Translation).
Office Action in U.S. Appl. No. 17/799,558, mailed on Jul. 30, 2024, 31 pages.
International Search Report and Written Opinion in International Appln. No. PCT/CN2020/079407, mailed on Nov. 11, 2020, 11 pages (with partial English translation).
International Search Report and Written Opinion in International Appln. No. PCT/CN2020/079409, mailed on Nov. 24, 2020, 12 pages (with partial English translation).
Office Action in Chinese Appln. No. 202020327594.8, dated Jul. 28, 2020, 4 pages (with partial English translation).
Office Action in Chinese Appln. No. 202020327594.8, dated Jun. 10, 2021, 5 pages (with partial English translation).
Office Action in Chinese Appln. No. 202020327594.8, dated Mar. 5, 2021, 5 pages (with partial English translation).
Office Action in Chinese Appln. No. 202020327594.8, dated Nov. 6, 2020, 5 pages (with partial English translation).
Office Action in Chinese Appln. No.202020315618.8, dated Aug. 25, 2020, 5 pages (with partial English translation).
Office Action in Chinese Appln. No.202020315618.8, dated Dec. 14, 2020, 6 pages (with partial English translation).
Office Action in Chinese Appln. No. 202010178596.X, dated Apr. 12, 2023, 20 pages (with Machine translation).

* cited by examiner

WIRELESS TRANSMISSION SYSTEM AND TRANSMITTING CONTROL DEVICE

CROSS REFERENCE TO RELATED APPLICATIONS

This application is the national phase of International Application No. PCT/CN2020/079407 filed on Mar. 14, 2020, which claims the benefit of priority from U.S. Provisional Application No. 62/979,176 filed on Feb. 20, 2020, the entire contents of which are incorporated herein by reference.

TECHNICAL FIELD

The present disclosure relates to the field of communication technologies, and in particular to a wireless transmission system and a transmitting control device.

BACKGROUND

In many shooting scenes such as film and television shooting and commercial shooting, a video acquired by a video acquisition device can be sent to a video receiving end through a wireless transmission technology, so that a director can monitor a shooting effect and adjust a shooting strategy. In some large-scale activities, in order to shoot a photographed object or a photographed scene in all directions and multiple angles, it is usually necessary to arrange multiple video acquisition devices. Since the photographed object is often in motion, each of the multiple video acquisition devices needs to be equipped with a photographer to control and adjust the video acquisition device, so that the photographed object can be tracked and shot. For most shooting scenes, the photographed object is relatively single, and means to control and adjust the video acquisition device are relatively fixed. However, a shooting time is usually long, sometimes as long as 4-5 hours, and thus, the photographer needs to gaze the photographed object for a long time and make corresponding adjustments to the video acquisition device in time. Since an operation of shooting adjustment itself is extremely monotonous and simple, it is easy to make people tired. In addition, one video acquisition device is equipped with one photographer, which also consumes a lot of manpower.

SUMMARY

Based on the above, the present disclosure provides a wireless transmission system and a transmitting control device.

According to a first aspect of embodiments of the present disclosure, there is provided a wireless transmission system, including a transmitting control device and a receiving control device, wherein the transmitting control device and the receiving control device are configured to be wirelessly connected, wherein the transmitting control device includes a first video interface unit, a first processing unit, a video encoding unit and a first wireless transmission unit, wherein
  the first video interface unit is configured to be connected to a video acquisition device to obtain video data acquired by the video acquisition device, the video acquisition device being external to the transmitting control device;
  the first processing unit is configured to determine video parameters of a photographed object based on an associated identification of the photographed object and the video data, track and analyze the video parameters of the photographed object to generate a control instruction, and control the video acquisition device to acquire the video data based on the control instruction;
  the video encoding unit is configured to perform compression encoding on the video data acquired by the video acquisition device; and
  the first wireless transmission unit is configured to transmit the compression encoded video data to the receiving control device;
  the receiving control device includes a second processing unit and a second wireless transmission unit, wherein
  the second processing unit is configured to determine the associated identification of the photographed object; and
  the second wireless transmission unit is configured to send the associated identification to the transmitting control device, and receive and output the compression encoded video data transmitted by the transmitting control device.

According to a second aspect of the embodiments of the present disclosure, there is provided a transmitting control device, including a video interface unit, a processing unit, a video encoding unit and a wireless transmission unit, wherein
  the video interface unit is configured to be connected to a video acquisition device to obtain video data acquired by the video acquisition device, the video acquisition device being external to the transmitting control device;
  the processing unit is configured to determine video parameters of a photographed object based on an associated identification of the photographed object and the video data, track and analyze the video parameters of the photographed object to generate a control instruction, and control the video acquisition device to acquire the video data based on the control instruction;
  the video encoding unit is configured to perform compression encoding on the video data acquired by the video acquisition device; and
  the wireless transmission unit is configured to transmit the compression encoded video data to a receiving control device.

According to the embodiments of the present disclosure, there is provided a wireless transmission system, including a transmitting control device and a receiving control device, wherein the transmitting control device includes a first video interface unit, a first processing unit and a first wireless transmission unit, and the transmitting control device is connected to an external video acquisition device through the first video interface unit to obtain video data of the video acquisition device, identifies video data of a photographed object according to an associated identification of the photographed object through the first processing unit, determines video parameters such as image quality parameters and position parameters of the photographed object according to the video data of the photographed object, tracks and analyzes the video parameters of the photographed object to determine whether current image quality parameters and position of the photographed object are in a reasonable range according to the video parameters of the photographed object, and then generates a corresponding control instruction to control the video acquisition device, so that the photographed object can be automatically tracked and shot. Meanwhile, the transmitting control device can also send the obtained video data to the receiving control device through the first wireless transmission unit, so that the receiving control device can output the video data for a user to view.

The receiving control device includes a second processing unit and a second wireless transmission unit, and the receiving control device can obtain the associated identification of the photographed object determined by the user through the second processing unit, and send the associated identification to the transmitting control device through the first wireless transmission unit, so that the user can remotely control the transmitting control device to track and shoot a specified target; in addition, the receiving control device can also receive the video data sent by the transmitting control device through the second wireless transmission unit and output the video data to the user. The wireless transmission system provided by the embodiments of the present disclosure can not only automatically control the video acquisition device to track and shoot the photographed object, but also can remotely control multiple video acquisition devices by one person, thereby greatly saving manpower.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Exemplary embodiments will be described in detail here, examples of which are illustrated in the accompanying drawings. When the following description refers to the drawings, unless otherwise indicated, the same numerals in different drawings indicate the same or similar elements. The implementations set forth in the following description of exemplary embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only adopted for the purpose of describing specific embodiments and not intended to limit the embodiments of the present disclosure. The singular forms "a", "one" and "the" used in the present disclosure and the appended claims are also intended to include plural forms, unless the context clearly indicates other meanings. It should also be understood that the term "and/or" as used in the present disclosure refers to and includes any and all possible combinations of one or more of the associated listed items.

It should be understood that, although terms first, second, third and the like may be adopted to describe various information in the embodiments of the present disclosure, the information should not be limited to these terms. These terms are only configured to distinguish the same type of information. For example, first information may also be referred to as second information, and similarly, the second information may also be referred to as the first information without departing from the scope of the embodiments of the present disclosure. For example, terms "if" and "in case of" used herein may be explained as "while" or "when" or "responsive to determining", which depends on the context.

Figure 1:
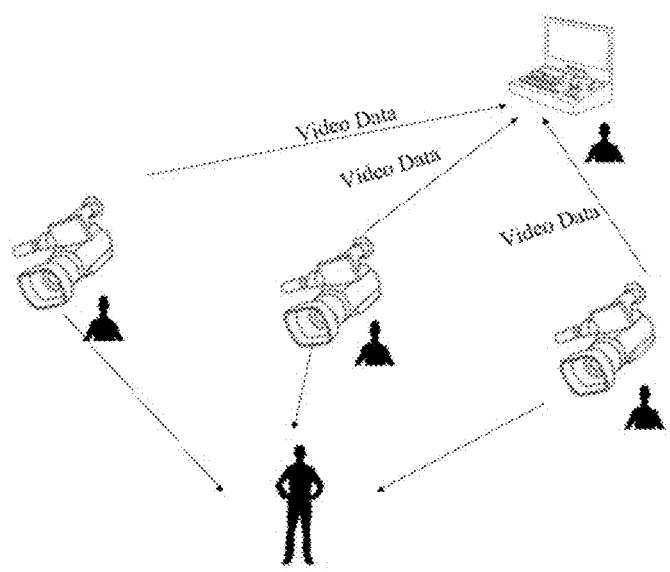
FIG. 1 is a schematic diagram illustrating a shooting scene of multiple video acquisition devices according to an embodiment of the present disclosure.

In many shooting scenes such as live party broadcast, live conference broadcast and film and television shooting, in order to shoot a photographed object from multiple angles, as shown in FIG. 1, multiple video acquisition devices can be arranged at different positions in a shooting site, each of the multiple video acquisition devices is equipped with a photographer to pay attention to a current state of the photographed object in real time and make adaptive amendments to the video acquisition device, for example, a position and aperture of the video acquisition device, a composition of the photographed object and other shooting parameters. After acquiring video data, the video acquisition device can send the video data to a video receiving end through a wireless transmission technology, so that staffs such as a director can remotely monitor video shooting effects and adjust shooting strategies in real time. For some large-scale activities, in order to acquire video data in all directions, it is necessary to arrange multiple video acquisition devices. Although in most scenes, the photographed object is relatively single, and only some simple adjustments are needed to video acquisition devices, in order to control each of the multiple video acquisition devices in real time, it is still necessary to equip the video acquisition device with a photographer, therefore, it is very labor-intensive for scenes that require a long shooting time and many photographers.

Based on the above, the present disclosure provides a wireless transmission system and a transmitting control device, wherein the transmitting control device can be used in the wireless transmission system, or can also be independently applied to other scenes. Through the wireless transmission system, the video acquisition devices can be automatically controlled to track and shoot the photographed object, and the director can also remotely control the video acquisition devices, thereby realizing that multiple video acquisition devices can be controlled by one person.

Figure 2:
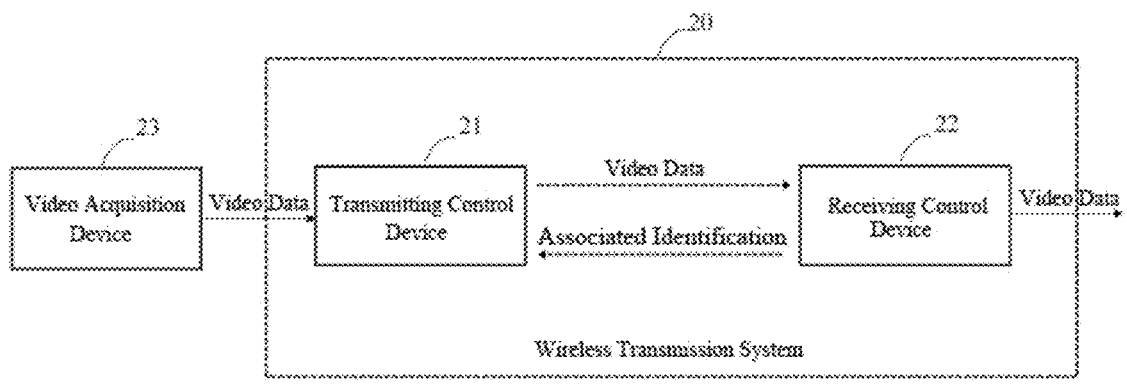
FIG. 2 is a schematic diagram illustrating a wireless transmission system according to an embodiment of the present disclosure.

The wireless transmission system and the transmitting control device will be described in detail below with reference to FIG. 2. As shown in FIG. 2, the wireless transmission system 20 includes a transmitting control device 21 and a receiving control device 22, wherein the transmitting control device 21 and the receiving control device 22 are configured to be wirelessly connected, wherein the number of transmitting control devices 21 connected to the receiving control device 22 is not limited. In FIG. 2, one transmitting control device 21 is taken as an example. The transmitting control device 21 is connected to a video acquisition device 23 being external to the transmitting control device 21, and is configured to obtain video data acquired by the video acquisition device 23, determine video data of a photographed object according to an associated identification of the photographed object to be tracked and shot, and determine video parameters of the photographed object according to the video data of the photographed object, wherein the video parameters can be various parameters presented by the photographed object on a video picture, for example, position parameters, image quality parameters, and the like. After determining the video parameters of the photographed object, the video parameters of the photographed object can be tracked and analyzed to determine, for example, whether current image quality parameters and brightness meet requirements, whether a current position of the photographed object is in a center area of the video picture, and the like; and then a control instruction corresponding to an analysis result can be generated, so that the video acquisition device 23 can be controlled to acquire the video data according to the control instruction, and the video data acquired by the video acquisition device 23 can be transmitted to the receiving control device 22.

Here, the photographed object refers to a target object that needs to be tracked and shot, and the number of the photographed object can be one or more. Since the photographed object is often in motion, for example, the photographed object is a speaker who walks back and forth on a stage, the video acquisition device 23 can be controlled to track and shoot the photographed object. In the related art, the video acquisition device 23 needs to be controlled by a photographer; however, in an embodiment of the present disclosure, the transmitting control device 21 can be configured to automatically track and shoot the photographed object. The transmitting control device 21 is connected with the video acquisition device 23, wherein the transmitting control device 21 can be connected to the video acquisition device 23 through a physical interface or a wireless communication technology. The transmitting control device 21 can obtain the video data acquired by the video acquisition device 23 from the video acquisition device 23, identify the photographed object according to the associated identification of the photographed object, determine the video parameters of the photographed object according to the video data of the photographed object, track and analyze the video parameters of the photographed object, generate a corresponding control instruction based on based on an analysis result, and then control the video acquisition device 23 to acquire the video data through the control instruction. For example, if it is determined that the photographed object moves to the left by analyzing the video parameters of the photographed object, the video acquisition device 23 can be controlled to move to the left. For example, if it is determined that the photographed object is approaching a lens by analyzing the video parameters of the photographed object, a focal length can be adjusted; and if it is determined that the brightness of the video picture is too low by analyzing the video parameters of the photographed object, an aperture size of the video acquisition device 23 can be adjusted.

In some embodiments, the video parameters may be one or more of the position parameters of the photographed object or the image quality parameters of the photographed object. The video parameters of the photographed object can be the image quality parameters of the photographed object, for example, brightness, contrast and exposure parameters of the video picture. Alternatively, the video parameters of the photographed object can also be the position parameters of the photographed object in the video picture, for example, a proportion of the photographed object in the video picture, and position information of the photographed object in the video picture.

In some embodiments, the position parameters of the photographed object may be position parameters of a head of the photographed object, or position parameters of body parts of the photographed object. Herein, a coordinate system can be established with a center of the video picture as a coordinate origin, the position parameters of the head can be coordinates of a center of the head of the photographed object and a height and width of an image area occupied by the head in the video picture, and the position parameters of the body parts can be coordinates of a center of a body of the photographed object and a height and width of an image area occupied by a whole human body in the video picture. In some embodiments, if the photographed object is a person, the video parameters of the photographed object may include one or more of human body position parameters and head position parameters of the photographed object.

Figure 3:
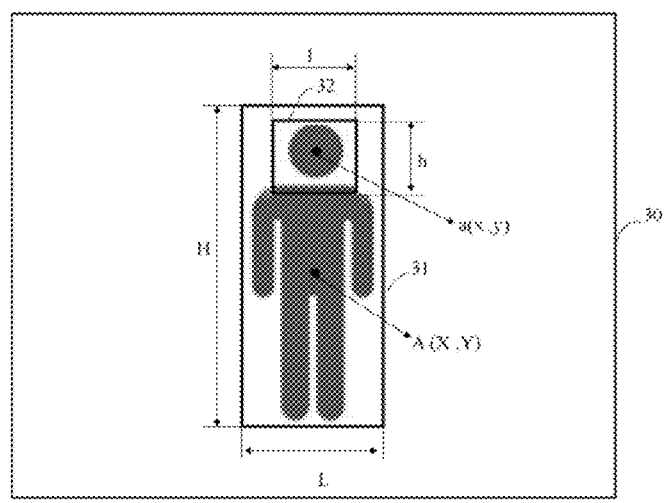
FIG. 3 is a schematic diagram illustrating position parameters of a photographed object according to an embodiment of the present disclosure.

In some embodiments, in order to more conveniently determine the position parameters of the photographed object, two rectangular frames (hereinafter referred to as a first rectangular frame and a second rectangular frame) can be determined in the video picture, wherein the first rectangular frame is a rectangular frame formed for a whole photographed object, and the second rectangular frame is a rectangular frame formed for the head of the photographed object. The human body position parameters of the photographed object include position information of a center, a width and a height of the first rectangular frame, and the head position parameters of the photographed object may include position information of a center, a width and a height of the second rectangular frame. Here, the first rectangular frame and the second rectangular frame may be rectangular frames automatically attached by an AI recognition algorithm when performing target detection on the photographed object, or may be rectangular frames determined by other means, which are not limited in the present disclosure. In order to better understand the first rectangular frame and the second rectangular frame in the embodiment of the present disclosure, the following will be described in detail with reference to FIG. 3. As shown in FIG. 3, a first rectangular frame 31 is a rectangular frame just containing a whole human body in a video picture 30, and a second rectangular frame 32 is a rectangular frame just containing a head in the video picture 30. The human body position parameters may be coordinates (X, Y) of a center A of the first rectangular frame 31 and a width L and height H of the first rectangular frame 31, and the head position parameters may be coordinates (x, y) of a center a of the second rectangular frame 32 and a width 1 and height h of the second rectangular frame 32.

Certainly, for other photographed objects, a similar method can also be used to determine position parameters of the photographed objects, and the photographed objects in the present disclosure are not limited to the person. By analyzing human body position parameters and head position parameters in continuous or interval multi-frame video pictures, dynamic position information of the photographed objects (that is, motion trajectories of the photographed objects) can be determined. Meanwhile, by adjusting the area ratio of the second rectangular frame to the whole video picture or the area ratio of the first rectangular frame to the whole video picture, a composition of the whole video picture can also be adjusted.

In some scenes, video images acquired by the video acquisition device may contain multiple target objects, but the photographed object that needs to be tracked and shot may only be one or several specified among the multiple target objects. Therefore, the transmitting control device 21 needs to first identify the photographed object from the multiple target objects according to the associated identification of the photographed object. The associated identification of the photographed object may be various identifications used to represent a uniqueness of the photographed object, features of the photographed object extracted from the video picture, an identity (ID) set for the photographed object, and the like. Here, the features can be all kinds of features representing characteristics of the photographed object, and the ID may be a serial number set for the photographed object according to the features of the photographed object. Taking the photographed object being a person as an example, when an accuracy of the AI recognition algorithm for recognizing the photographed object is relatively high, the associated identification may be one or more of facial features, head features or human body features extracted from target photographed objects. Certainly, since a high-precision AI recognition algorithm requires a device to have relatively high computing power, and the transmitting control device uses embedded devices in most scenes, which have relatively weak computing power and cannot use the high-precision AI recognition algorithm, a self-designed target recognition and detection algorithm can be used, that is, pixel features of an image area where the photographed object is located in the video picture can be extracted as the features of the photographed object, and the photographed object can be identified according to the pixel features. The pixel features can be obtained based on the brightness of pixels in the image area where the photographed object is located, the chromaticity of the pixels, and the contour of the image area. For example, the pixel features can be features obtained by weighting the chromaticity and brightness of the pixels in the image area and the contour of the image area. In some scenes, for example, when a movement speed of the photographed object is relatively slow or the photographed object is in a stationary state, the position parameters of the photographed object can also be used as its feature. In this way, the target detection and recognition algorithm can be simplified, which is more suitable for the embedded devices with relatively poor computing power.

Certainly, in order to simplify the associated identification, a serial number can be set for each photographed object. The serial number is bound to the features of the photographed object, and the photographed object can be distinguished by the serial number.

The associated identification of the photographed object can be determined on a side of the transmitting control device 21 or on a side of the receiving control device 22. In some shooting scenes, if the photographed object remains unchanged, after the photographer initially aims the lens of the video acquisition device 23 at the photographed object, the transmitting control device 21 can extract the features of the photographed object, and set a serial number for the features as the associated identification of the photographed object. In the process of tracking and shooting, the transmitting control device 21 can identify one or more target objects of a specified type from each frame of images. For example, if the photographed object is a person, all humanoid targets in the frame of the images can be identified by the AI recognition algorithm, features of each of the humanoid targets can be extracted, a serial number corresponding to the features of the humanoid target can be determined according to a binding relationship between the features and the serial number, and then the photographed object can be identified according to the serial number.

In some scenes, the associated identification can also be determined by the receiving control device 22. For example, after the associated identification of the photographed object is determined by the director through remote control, the associated identification can be sent to the transmitting control device 21 through the receiving control device 22. For example, the video acquisition device 23 may acquire video data of multiple target objects, and the photographed object that needs to be tracked and shot may only be one or several of the multiple target objects, in this case, the transmitting control device 21 may number these target objects to distinguish them. The transmitting control device 21 can identify these target objects from the video data through a target detection algorithm, and a type of the target objects detected by the transmitting control device 21 can be preset according to shooting requirements. For example, if an object to be tracked and shot is a person, all humanoid target objects in the video data can be detected; and if the object to be tracked and shot is other target objects, the other target objects in the video data can be detected. After the target objects are detected, features of each of the target objects can be extracted, and a serial number is set for the target object, wherein the serial number of the target object is bound to the features of the target object. The serial number of the target object can be marked in the video data, for example, a callout frame is used to mark out the target object and is marked with the serial number of the target object. The marked video data is sent to the receiving control device 22, so that the marked video data can be output and displayed to a user through the receiving control device 22. The user can determine a photographed object from these target objects, for example, the user can determine a serial number of the photographed object according to the serial number marked for the target object in the video picture, and then input the serial number through the receiving control device 22. After the serial number of the photographed object selected by the user is determined, the receiving control device 22 sends the serial number of the photographed object to the transmission control device 21. Certainly, in some embodiments, if the video data received by the receiving control device 22 is unnumbered, the user can also directly select the photographed object from the target objects through the receiving control device 22. For example, the photographed object can be selected by a frame-selection tool, the receiving control device 22 can extract features of the photographed object selected by the user, and send the features to the transmitting control device 21, so that the transmitting control device 21 can identify the photographed object according to the features.

After receiving the associated identification of the photographed object, the transmitting device 21 can identify the video parameters of the photographed object according to the associated identification of the photographed object. In some embodiments, the associated identification can be the serial number corresponding to the photographed object. For each frame of the video data acquired by the video acquisition device 23, the transmitting control device 21 can first detect one or more target objects of a specified type according to the video data, wherein the one or more target objects include the photographed object, and the one or more target objects of the specified type can be determined according to the type of the shot objects, for example, if the photographed object is a person, the one or more target objects of the specified type are also a person. The transmitting control device 21 can detect all humanoid target objects in the video picture. After all target objects are detected, the transmitting control device 21 can determine the serial number of each of the target objects and the video parameters of the target object, identify the photographed object from the target objects according to the serial number of the photographed object and the determined serial number of the target object, and determine the video parameters of the photographed object.

In some embodiments, the serial number of the target object can be determined according to one or more of a predetermined binding relationship between the serial number of the target object and the features of the target object or dynamic position information of the target object. For example, after the target objects are detected, the transmitting control device 21 can extract features of each of the target objects, and then determine a serial number of the target object according to the predetermined binding relationship between the serial number of the target object and the features of the target object. Certainly, since the movement of the target object in each frame of video data is very slow, in some embodiments, the serial number of the target object can also be determined according to the dynamic position information of the target object, for example, according to a motion trajectory of the target object, it can be roughly determined that the target object should be at a left position of the video picture, but not at a right position. Certainly, in order to determine the serial number of the target object more accurately, in general, the serial number of the target object can be determined by combining the features of the target object and the dynamic position information of the target object.

In some embodiments, the features of the target object includes at least one of: head features of the target object, body features of the target object, or pixel features of an image area corresponding to the target object, wherein the pixel features of the image area corresponding to the target object can be obtained according to the chromaticity of pixels in the image area, the brightness of the pixels and the contour of the image area. For example, if the target object is a person, the features of the target object can be one or more of face features, head features or human body features.

Certainly, in some embodiments, if the computing power of a device that identifies the target object is relatively poor, for example, an embedded device, the pixel features of the image area where the target object is located in the video picture can also be extracted as the features of the photographed object, wherein the pixel features can be features obtained by weighting the brightness and chromaticity of the pixels in the image area where the target object is located and the contour of the image area, or can also be the position parameters of the target object.

The receiving control device 22 can be configured to determine the associated identification of the photographed object and send the associated identification to the transmitting control device 21, or can also be configured to output the video data transmitted by the transmitting control device 21 for display to the user.

In some embodiments, the receiving control device 22 includes a display component, so that the video data can be directly displayed to the user. For example, the receiving control device 22 can be an application (APP) installed on a terminal device, and can receive and display the video data acquired by the video acquisition device 23 sent by the transmitting control device 21 through the APP; meanwhile, the user can also input a human-computer interaction instruction through the APP, and the receiving control device 22 can send the human-computer interaction instruction to the transmitting control device 21, so that the video acquisition device 23 can be controlled by the transmitting control device 21. The human-computer interaction instruction can be an instruction which carries the associated identification of the photographed object and is for remotely controlling a camera control unit (CCU) of the video acquisition device 23, for example, turning the video acquisition device 23 on/off, adjusting aperture and/or focus of the video acquisition device 23.

In some embodiments, the receiving control device 22 can be connected to a video receiving end through a physical interface. For example, the receiving control device 22 can be connected to a monitoring station or a video switcher, and then send the video data to the monitoring station and the video switcher; meanwhile, the receiving control device 22 can also receive a control instruction for the video acquisition device 23 sent by the user through the video monitoring station.

In some embodiments, the receiving control device 22 can also transmit video data to the video receiving end through the wireless transmission technology, wherein the video receiving end can be a mobile terminal device such as a personal mobile phone and a notebook computer. For example, the receiving control device 22 can be an independent electronic device. The receiving control device 22 wirelessly communicates with the APP installed in the mobile terminal device, and the APP of the mobile terminal device receives the video data from the transmitting control device 21 through the receiving control device 22 and displays the video data. The user can input the human-computer interaction instruction through the APP, and the human-computer interaction instruction can be sent to the transmitting control device 21 through the receiving control device 22, so as to the video acquisition device 23 can be controlled by the transmitting control device 21. One receiving control device 22 can be communicatively connected to one or more transmitting control devices 21, and each of the one or more transmitting control devices 21 can be connected to one video acquisition device 23, so that multiple video acquisition devices can be controlled by one person.

In some embodiments, the mobile terminal device installed with the APP for receiving the video data, the transmitting control device 21 and the receiving control device 22 can be connected through a WIFI channel, wherein the receiving control device 22 works in an access point (AP) mode, the transmitting control device 21 and the mobile terminal device installed with the APP work in a station (STA) mode. The receiving control device 22 turns on a WIFI hotspot, the transmitting control device 21 and the mobile terminal device installed with the APP search for a service set identifier (SSID) of the receiving control device 22, and establish a WIFI connection with the receiving control device 22 through a preset password. The transmitting control device 21 transmits the video data to the APP through the established WIFI connection for the user to watch. The APP transmits the human-computer interaction instruction input by the user to the transmitting control device 21 so that the video acquisition device 23 can be remotely controlled.

Through the wireless transmission system, the transmitting control device 21 can identify the photographed object, determine the video parameters of the photographed object, analyze and track the video parameters of the photographed object, and automatically control the video acquisition device 23 to track and shoot the photographed object according to the analysis result; meanwhile, the director can also transmit the control instruction through the wireless transmission system to remotely control the video acquisition device 23, therefore, multiple video acquisition devices 23 can be controlled by only one director, which greatly saves human resources.

Figure 4:
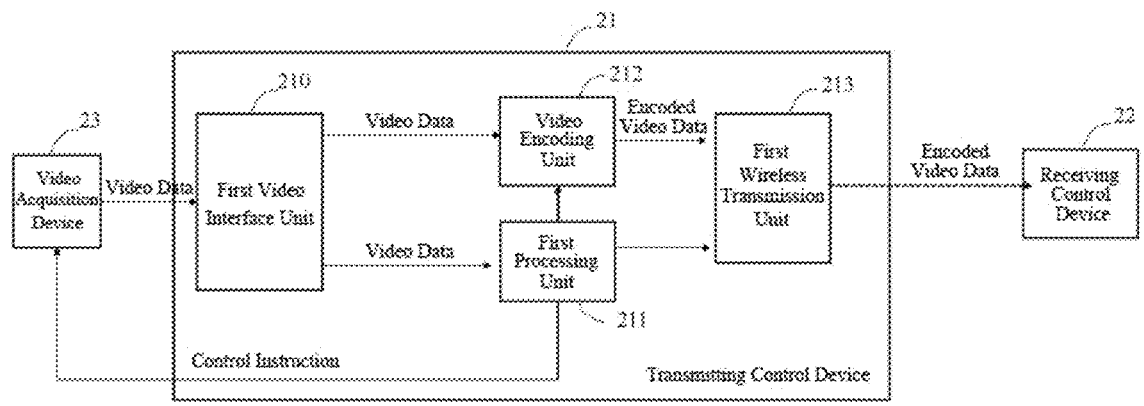
FIG. 4 is a schematic structural diagram illustrating a transmitting control device according to an embodiment of the present disclosure.

FIG. 4 is a schematic diagram illustrating an internal structure of the transmitting control device 21. The transmitting control device 21 includes a first video interface unit 210, a first processing unit 211, a video encoding unit 212 and a first wireless transmission unit 213. The first video interface unit 210 is connected to a video acquisition device 23 being external to the transmitting control device 21, and is configured to obtain video data acquired by the video acquisition device 23. The first video interface unit 210 transmits the video data to the first processing unit 211 and the video encoding unit 212. The first processing unit 211 can identify the photographed object according to an associated identification of the photographed object, determine video parameters of the photographed object according to the video data of the photographed object, and track and analyze the video parameters of the photographed object; for example, the first processing unit 211 can determine position parameters and image quality parameters of the photographed object, generate a control instruction according to a result of tracking and analyzing the position parameters and image quality parameters of the photographed object, and then control the video acquisition device 23 to track and shoot the photographed object according to the control instruction. The video encoding unit 212 performs compression encoding on the video data acquired by the video acquisition device 23, and then transmits the compression encoded video data to the receiving control device 22 through the first wireless transmission unit 213. Meanwhile, the first processing unit 211 can also send the determined video parameters of the photographed object to the receiving control device 22 or the video encoding unit 212 through the first wireless transmission unit 213. The video encoding unit 212 performs compression encoding on the video data acquired by the video acquisition device 23, and then transmits the compression encoded video data to the receiving control device 22 through the first wireless transmission unit 213.

Figure 5:
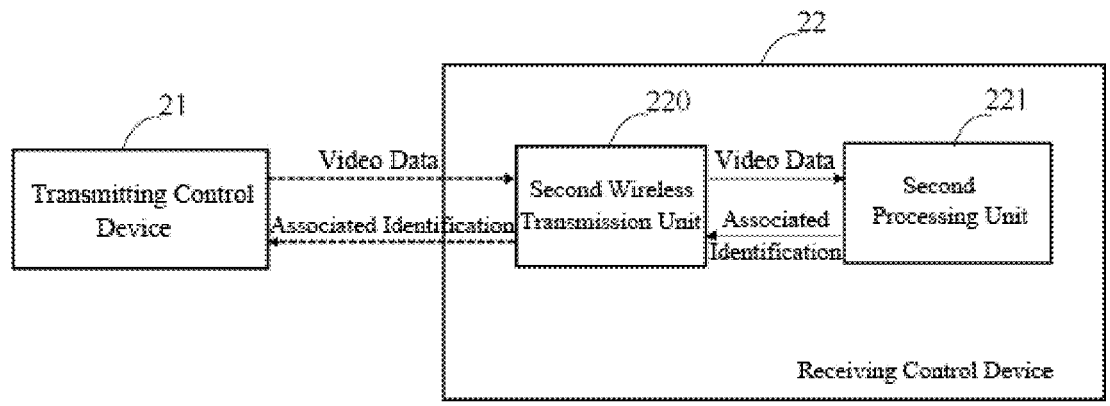
FIG. 5 is a schematic structural diagram illustrating a receiving control device according to an embodiment of the present disclosure.

Correspondingly, FIG. 5 is a schematic structural diagram illustrating a receiving control device 22. The receiving control device 22 includes a second processing unit 221 and a second wireless transmission unit 220. The second processing unit 221 is configured to determine the associated identification of the photographed object, send the associated identification to the transmitting control device 21 through the second wireless transmission unit 220, and receive and output the compression encoded video data transmitted by the transmitting control device 21.

In some embodiments, the number of video channels of the first video interface unit 210 of the transmitting control device 21 corresponds to the number of video channels of the video acquisition device 23. For example, if the video acquisition device 23 includes high definition multimedia interface (HDMI) standard video data and serial digital interface (SDI) standard video data, the first video interface unit 210 of the transmitting control device 21 further includes an HDMI interface and an SDI interface, so that different data can be received from the video acquisition device 23.

Figure 6:
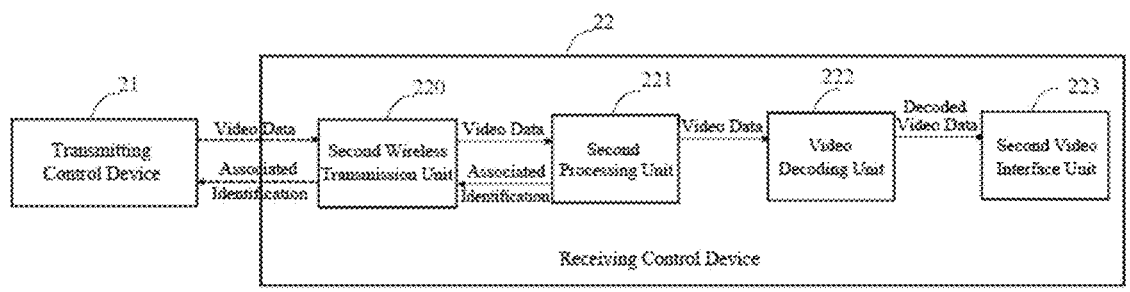
FIG. 6 is a schematic structural diagram illustrating a receiving control device according to an embodiment of the present disclosure.

In some embodiments, the receiving control device 22 can first decode the received encoded data and then output the data. Therefore, the receiving control device 22 further includes a video decoding unit 222 and a second video interface unit 223, as shown in FIG. 6. The video decoding unit 222 decompresses and decodes the video data received from the transmitting control device 21, and then outputs the video data through the second video interface unit 223. For example, the second video interface unit 223 may be an SDI interface or an HDMI interface, and the video data is output to the monitoring station or the video switcher through the second video interface unit 223. In some embodiments, the second processing unit 221 and the video decoding unit 222 can be integrated on one chip, for example, a chip that integrates a central processing unit (CPU) function and an H264/H265 encoding and decoding function.

In some embodiments, if the receiving control device 22 is only connected to one transmitting control device 21, the video data received by the video decoding unit 222 is single-channel video data, and only the single-channel video data needs to be decoded. In some embodiments, if the receiving control device 22 is connected to multiple transmitting control devices 21, the video data received by the video decoding unit 222 is multi-channel video data, the video decoding unit 222 may have a multi-channel decoding capability, and can decode the video data sent by different transmitting control devices 21 at the same time and output the decoded video data to the monitoring station or the video switcher. The number of video channels output by the second video interface unit 223 of the receiving control device 22 corresponds to the number of video channels sent by the transmitting control device 21.

Figure 7:
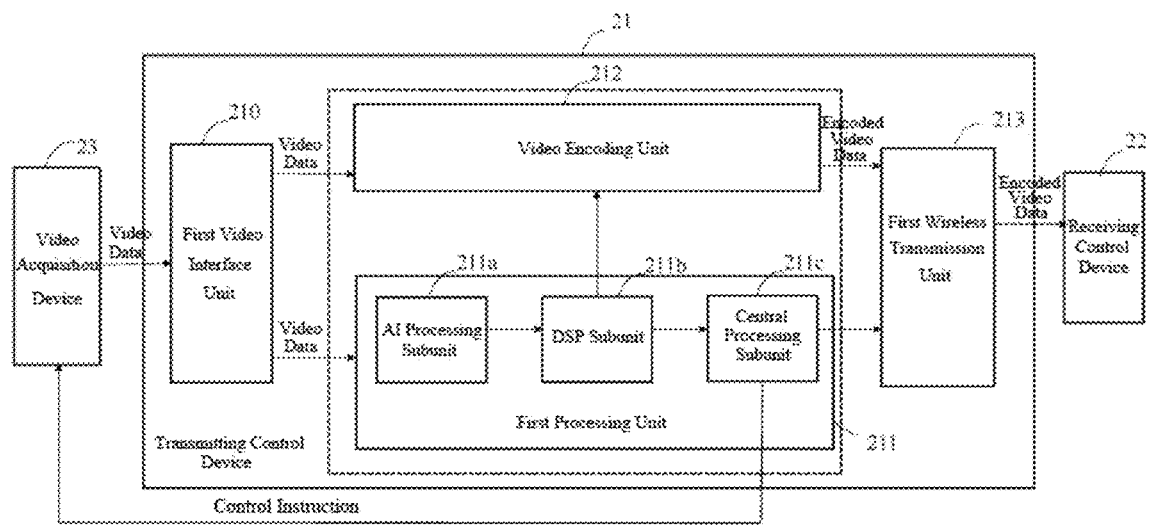
FIG. 7 is a schematic structural diagram illustrating a transmitting control device according to an embodiment of the present disclosure.

In some embodiments, as shown in FIG. 7, the first processing unit 211 includes an artificial intelligence (AI) processing subunit 211a, a digital signal processing (DSP) subunit 211b and a central processing subunit 211c. The AI processing subunit 211a can obtain the video data acquired by the video acquisition device 23 from the video interface unit 210, and detect one or more target objects of a specified type from the video data, wherein the one or more target objects of the specified type include the photographed object, and the one or more target objects of the specified type are preset according to the photographed object. For example, if the photographed object is a person, and the one or more target objects of the specified type are a humanoid target object, the AI processing subunit 211a can detect all humanoid target objects in a video picture according to a preset target detection algorithm. General target detection algorithms can be used to detect to the target objects. For example, a machine learning algorithm can be used to identify the humanoid target objects in the video picture to detect the target object; certainly, the self-designed target recognition and detection algorithm can also be used to detect the target object. After the target objects in the video data are determined, the AI processing subunit 211a can send the determined target objects and the video data of the target objects to the DSP subunit 211b, so that the DSP subunit 211b can determine a serial number and video parameters of each of the target objects according to the video data of the target objects, and then send the serial number and video parameters of the target object to the central processing subunit 211c. The central processing subunit 211c can identify the photographed object from the target objects according to the serial number of the photographed object and the serial number of each of the target objects, determine the video parameters of the photographed object, analyze the video parameters of the photographed object to generate a control instruction, and control the video acquisition device 23 to acquire the video data according to the generated control instruction. The DSP subunit 211b can be a DSP image processing chip, on which a self-designed algorithm is integrated to determine the serial number and video parameters of the target object. The central processing subunit 211c can be a CPU, through which the photographed object can be determined, the control instruction can be generated and the video acquisition device can be controlled.

After the target objects in a first frame of the video data detected by the AI processing subunit 211a are received, the DSP subunit 211b can extract features of each of the target objects from the video data of the target objects, wherein the features can be face features, head features and body features of the target object, or pixel features obtained by weighting the brightness, chromaticity, contrast and contour of image areas of the target object; further, the DSP subunit 211b can set a serial number for the target object, and determine and store a binding relationship between the serial number of the target object and the features of the target object, so that the target object can be numbered subsequently. Meanwhile, the DSP subunit 211b can also analyze the video data of the target object to obtain video parameters (for example, image quality parameters such as exposure and brightness) of the target object and position information (for example, coordinates of the center, the width and the height of the first rectangular frame for the target object, and coordinates of the center, the width and the height of the second rectangular frame for the target object). Further, the DSP subunit 211b can correspondingly store the serial number, the features and the video parameters of each of the target objects in the form of a data table, and send the data table to the central processing subunit 211c. When the target objects in a second frame of the video data, a third frame of the video data and subsequent frames of the video data detected by the AI processing subunit 211a are received again, the DSP subunit 211b can first determine the serial number of each of the target objects. In some embodiments, the serial number of the target object can be determined according to the binding relationship between a predetermined serial number of the target object and the features of the target object. For example, the DSP subunit 211b extracts the features of the target object, and determines the serial number of the target object according to the pre-stored binding relationship between the serial number of the target object and the features of the target object. Certainly, in general, a movement speed of the target object is relatively slow, for example, for a 1080p 60 s video, a time interval between frames is 16.7 ms, therefore, dynamic position information of the target object can also be used to help determine the serial number of the target object. For example, the DSP subunit 211b can determine dynamic position information of the target object, and then determine the serial number of the target object by combining the predetermined binding relationship between the serial number of the target object and the features of the target object and the dynamic position information of the target object. Certainly, if a new target object is detected, a serial number of the new target object is reset. After analyzing the target objects in a frame of the video data every time, the DSP subunit 211b can determine the serial number, the features and the video parameters of the target object in the frame of the video data, and then can update the data table storing a corresponding relationship among the serial number, the features and the video parameters of the target object, so that the video parameters of the target object in a new frame of the video data can be updated to the data table. The DSP subunit 211b can send the serial number, the feature and the video parameters of the target object to the central processing subunit 211c at a certain time interval in the form of the data table. For example, the serial number, the feature and the video parameters of the target object can be sent after the data table is updated every time, or can be sent at regular intervals.

In some embodiments, the dynamic position information of the target object can be obtained according to the position information of the center of the first rectangular frame and/or the position information of the center of the second rectangular frame corresponding to the target object in multi-frame video pictures. The first rectangular frame is a rectangular area formed for a whole target object, and the second rectangular frame is a rectangular area formed for a head of the target object, the details can refer to the description of FIG. 3, which will not be repeated here. The multi-frame video pictures can be continuous multi-frame video pictures or interval multi-frame video pictures, which can be flexibly set according to actual needs.

The central processing subunit 211c can receive the serial number of the photographed object input by the user from the receiving control device 22, determine the photographed object from the target objects according to the serial number of the photographed object and the data table recording the serial numbers and the video parameters of respective target objects obtained from the DSP subunit 211b, determine the video parameters of the photographed object, analyze the video parameters of the photographed object, for example, whether the exposure is reasonable and whether the composition proportion meets requirements, and generate the control instruction according to the analysis result to control the video acquisition device 23.

Figure 8:
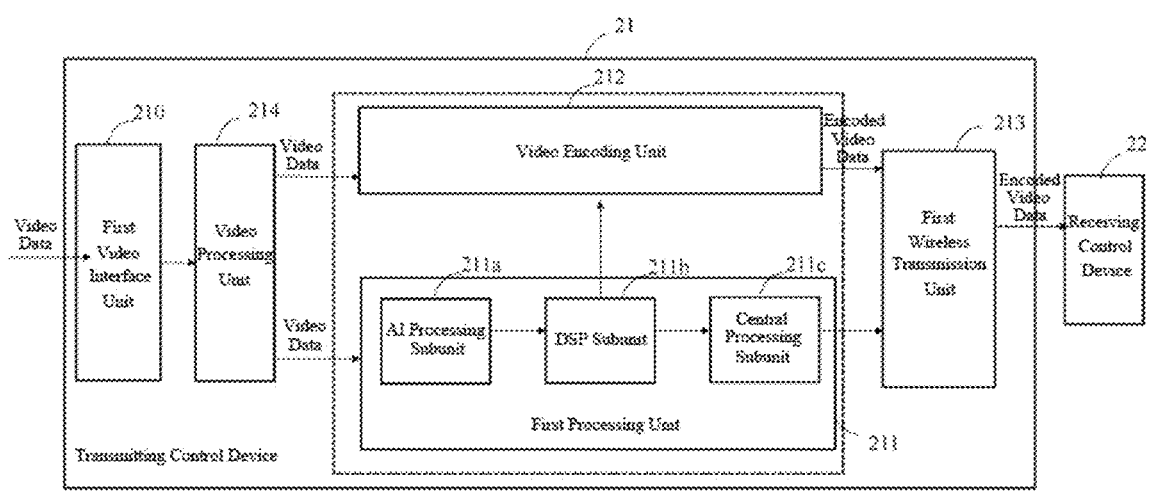
FIG. 8 is a schematic structural diagram illustrating a transmitting control device according to an embodiment of the present disclosure.

In some embodiments, as shown in FIG. 8, the transmitting control device 21 further includes a video processing unit 214. The video processing unit 214 receives the video data from the first video interface unit 210, and processes and outputs the video data to the AI processing subunit 211a. For example, the video data is processed by format conversion and image enhancement, and then is output to the AI processing subunit 211a. In some embodiments, the video processing unit 214 may be a field programmable gate array (FPGA) chip.

In some embodiments, the video encoding unit 212, the AI processing subunit 211a, the DSP subunit 211b and the central processing subunit 211c may be four independent functional units. In some embodiments, the video encoding unit 212, the AI processing subunit 211a, the DSP subunit 211b and the central processing subunit 211c may also be integrated on one chip.

Figure 9:
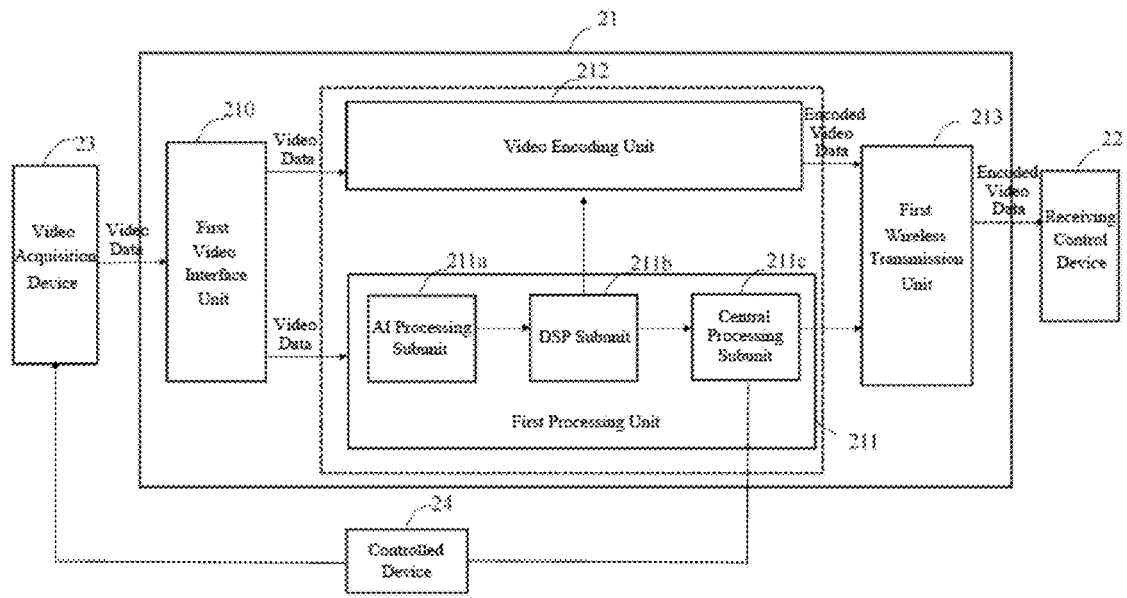
FIG. 9 is a schematic structural diagram illustrating a transmitting control device according to an embodiment of the present disclosure.

The transmitting control device 21 can control the video acquisition device 23 through some devices. For example, an aperture size, an on/off, a focal length, a recording function of the video acquisition device 23 can be controlled by the CCU; and a position of the video acquisition device 23 can be controlled by devices such as a gimbal, for example, the video acquisition device 23 is controlled to move left and right, to move back and forth and to rotate. In order to better control the video acquisition device 23, in some embodiments, as shown in FIG. 9, the wireless transmission system 20 further includes a controlled device 24. The controlled device 24 establishes a communication connection with the video acquisition device 23, and also establishes a communication connection with the central processing subunit 211c of the transmitting control device 21. The controlled device 24 controls the video acquisition device 23 to acquire the video data based on the control instruction generated by the central processing subunit 211c, wherein the controlled device 24 and the video acquisition device 23 can be connected through a physical interface or through a wireless communication technology.

Figure 10:
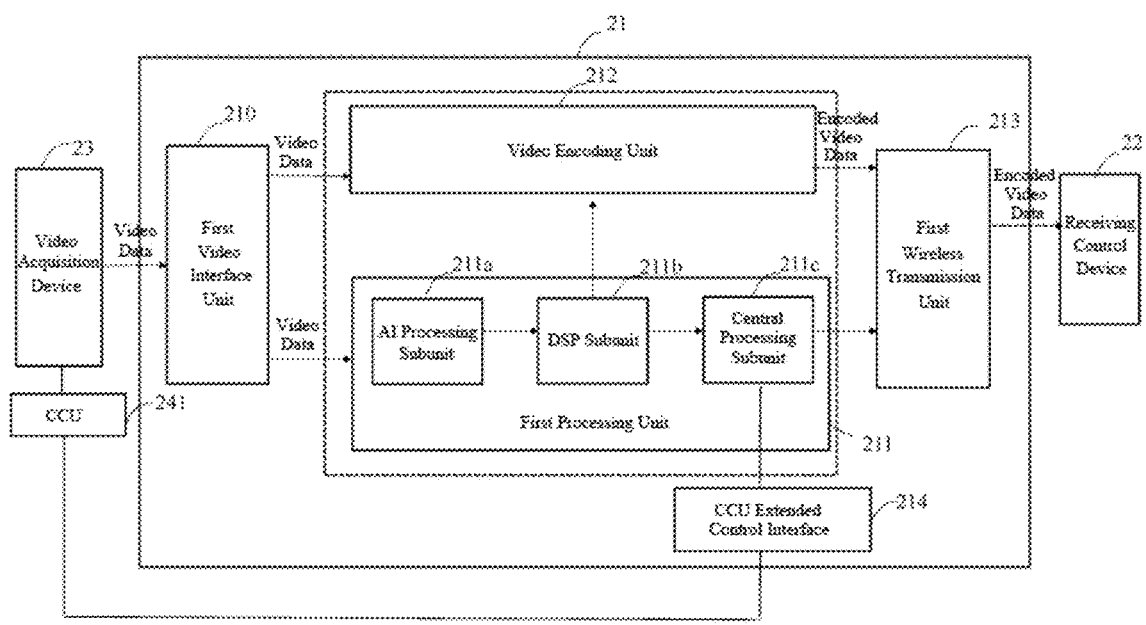
FIG. 10 is a schematic structural diagram illustrating a transmitting control device according to an embodiment of the present disclosure.

In some embodiments, as shown in FIG. 10, the controlled device 24 includes a camera control unit (CCU) 241, the transmission control apparatus 21 includes a CCU extended control interface 214 connected to the central processing subunit 211c, and the central processing subunit 211c is connected to the CCU 241 through the CCU extended control interface 214. After the control instruction is generated, the central processing subunit 211c sends the control instruction to the CCU 241 through the CCU extended control interface 214, so that the CCU 241 controls the video acquisition device 23, that is, the CCU 241 adjusts the video picture acquired by the video acquisition device 23. In some embodiments, the control instruction generated by the transmitting control device 21 according to the analysis result of the video parameters of the photographed object is mainly used to control the CCU to adjust parameters of the video acquisition device 23, wherein the parameters include one or more of zoom parameters, aperture adjusting parameters, recordation controlling parameters and on/off controlling parameters. The video picture acquired by the video acquisition device 23 can be adjusted according to the control instruction, for example, by adjusting aperture, controlling lens zoom, turning the video acquisition device 23 on/off, controlling recordation of the video acquisition device 23 to start an internal storage and recordation of the video acquisition device 23.

In some embodiments, a control instruction for controlling the CCU to adjust the parameters of the video acquisition device 23 can be generated by tracking and analyzing the image quality parameters of the photographed object, or based on a result from comparing a proportion of the photographed object in a current video picture with a proportion defined in a specified composition, or based on both the image quality parameters of the photographed object and the result from comparing the proportion of the photographed object in the current video picture with the proportion defined in the specified composition. For example, the control instruction can be generated according to the brightness, the contrast and a saturation of the acquired video picture to adjust the video acquisition device 23, so that an image with better image quality can be obtained. In addition, in order to make the acquired video picture have a good composition effect, the proportion of the photographed object in the video picture is also very important. For example, the photographed object accounts for ½ or ⅕ of the video picture, and whether the video picture displays a whole body or a half body of the photographed object will directly affect the effect of the video picture. The specified composition is a composition with a preset composition mode, and the position information and composition proportion of the photographed object in the whole video picture are defined in the specified composition. Taking that the photographed object is a person as an example, referring to FIG. 3, the composition proportion defined in the specified composition may be an area ratio of the first rectangular frame 31 of the photographed object to the video picture 30, and an area ratio of the second rectangular frame 32 of the photographed object to the video picture 30; and the position information of the photographed object defined in the specified composition may be an offset range of the center of the first rectangular frame 31 of the photographed object and the center of the second rectangular frame 32 of the photographed object from a specified position in the video picture 30, for example, an offset range of the center of the first rectangular frame 31 of the photographed object and the center of the second rectangular frame 32 of the photographed object from a center position in the video picture 30. When adjusting the video acquisition device 23, the position information and composition proportion of the photographed object in the whole video picture defined in the specified composition can be used as a reference to automatically adjust the video acquisition device 23. According to different requirements in close-range and long-range shooting scenes, the user can set the ratio of the photographed object to the video picture in the specified composition, and the offset range between the center of the photographed object and the specified position in the video picture.

In some embodiments, the specified composition can be pre-configured by the user in advance, and then stored in the transmitting control device 21. Certainly, in some embodiments, the specified composition can also be sent by the receiving control device 22 to the transmitting control device 21 through the human-computer interaction instruction.

In the process of adjusting the parameters of the video acquisition device 23, a parameter for adjusting the aperture size is a very important parameter, which directly affects the brightness, saturation and contrast of the acquired video picture. Therefore, in some embodiments, a control instruction for adjusting the parameter of the aperture size can be generated according to the image quality parameters such as a brightness histogram or an exposure coefficient of the video data. The transmitting control device 21 can identify the photographed object according to the associated identification of the photographed object, determine the video data of the photographed object, analyze the brightness of the video data in real time to obtain the brightness histogram or the exposure coefficient of the photographed object, and generate a control instruction according to the brightness histogram or the exposure coefficient to control the CCU to adjust the aperture of the video acquisition device 23. By dynamically adjusting the aperture size with the CCU, an exposure value of the video picture can be kept in a reasonable range.

Figure 11:
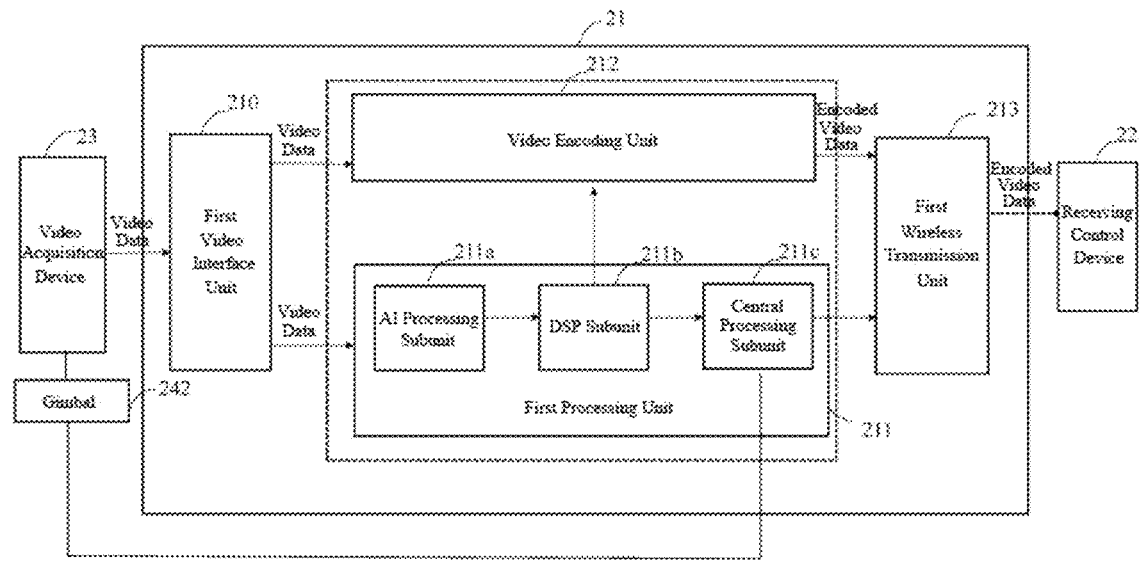
FIG. 11 is a schematic structural diagram illustrating a transmitting control device according to an embodiment of the present disclosure.

The zoom parameters are also important parameters that need to be adjusted during shooting. The adjustment of the focal length mainly affects the composition of the photographed object in the video picture, for example, whether the photographed object is a whole body or half body, and what proportion of the video picture is. Therefore, in some embodiments, a control instruction for controlling the zoom parameters can be determined according to the result from comparing the proportion of the photographed object in the current video picture with the proportion defined in the specified composition. For example, when a proportion of a head of a person in a video picture exceeds a certain range compared to the proportion defined in the specified composition, a focal length parameter can be adjusted to ensure that proportion of the head is in a reasonable range. In some embodiments, the proportion of the photographed object in the current video picture may be one or more of an area ratio of the first rectangular frame of the photographed object to the video picture, or an area ratio of the second rectangular frame of the photographed object to the video picture, that is, a proportion of the head of the photographed object in the video picture, or a proportion of a body of the photographed object in the video picture. Since the photographed object is usually moving, in order to track the moving photographed object in real time to ensure that the photographed object is in the video picture or at a fixed position in the video picture, it is necessary to control the video acquisition device 23 to move along with a moving direction of the photographed object. In some embodiments, as shown in FIG. 11, the controlled device 24 may further include a gimbal 242, the video acquisition device 23 may be mounted on the gimbal 242, so that the video acquisition device 23 is driven to move by the gimbal 242. The gimbal 242 is connected to the central processing subunit 211c of the transmitting control device 21, receives a control instruction sent by the central processing subunit 211c, and drives the video acquisition device 23 to move according to the control instruction.

Figure 12:
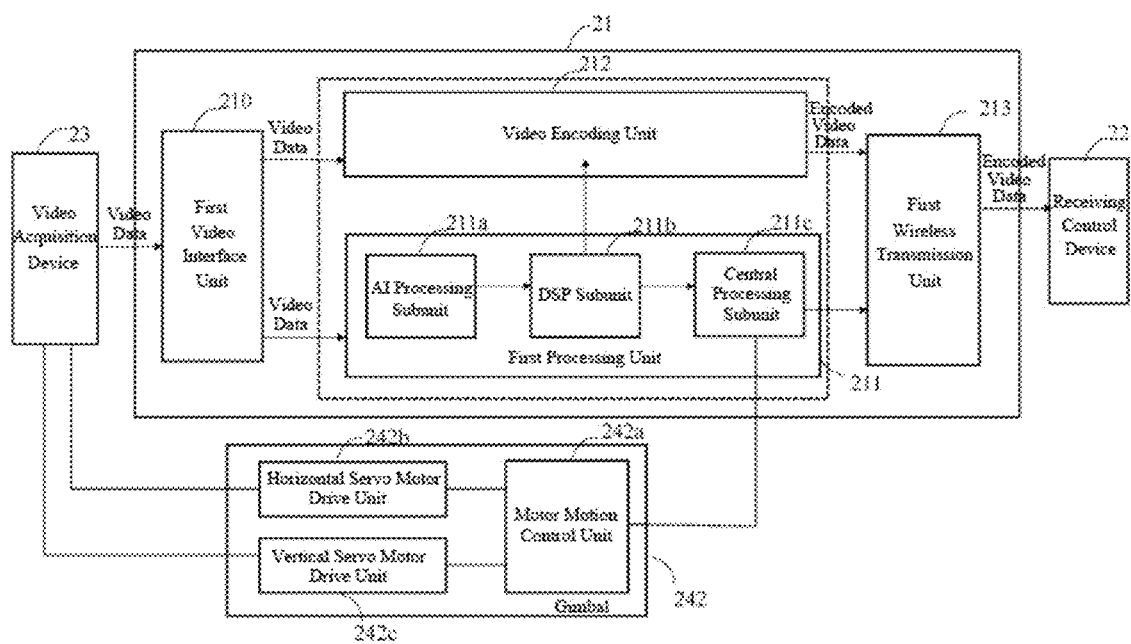
FIG. 12 is a schematic structural diagram illustrating a transmitting control device according to an embodiment of the present disclosure.

Since a professional video acquisition device 23 is relatively large in volume and heavy in weight, it is necessary for the gimbal 242 to have a strong bearing capacity, a relatively fast rotation speed and a relatively high accuracy. In some embodiments, as shown in FIG. 12, the gimbal 242 includes a motor motion control unit 242a, a horizontal servo motor drive unit 242b and a vertical servo motor drive unit 242c respectively connected to the motor motion control unit 242a. The motor motion control unit 242a is connected to the central processing subunit 211c of the transmitting control device 21, and the central processing subunit 211c sends a generated control instruction to the motor motion control unit 242a, wherein the control instruction is used to instruct the motor motion control unit 242a to control the horizontal servo motor drive unit 242b to drive the video acquisition device 23 to rotate in a horizontal plane, and to control the vertical servo motor drive unit 242c to drive the video acquisition device 23 to roll in a vertical plane, so that a position of the acquired photographed object in the video picture is in a position range of the photographed object defined in the specified composition.

The controlled device 24 can include only the CCU 241, or only the gimbal 242, or can include both the CCU 241 and the gimbal 242, which can be set according to actual usage scenes. In some embodiments, the controlled device 24 and the transmitting control device 21 can be physically integrated into a whole piece, that is, the controlled device 24 and the transmitting control device 21 are integrated into one device. For example, the transmitting control device 21, the CCU 241 and the gimbal 242 can be integrated into one device. Certainly, in some embodiments, the controlled device 24 and the transmitting control device 21 can also be disposed independently of each other. For example, the transmitting control device 21, the CCU 241 and the gimbal 242 are three independent devices, which are connected to each other through physical interfaces.

A control instruction for controlling the movement of the gimbal 242 can be obtained according to a result from comparing position information of the photographed object in the current video picture with position information defined in the specified composition. For example, the specified composition defines the position range of the photographed object in the video picture. After determining the position information of the photographed object in the current video picture, if the photographed object is out of the defined position range, the position of the video acquisition device 23 can be adjusted through the gimbal 242, for example, the video acquisition device 23 is moved left and right or up and down.

The specified composition can adopt a center composition mode, that is, the photographed object is located in a center of the video picture. Certainly, other composition modes can also be used. In some embodiments, the position information of the photographed object in the current video picture includes at least one of: a position offset of the center of the first rectangular frame relative to the specified position in the video picture, or a position offset of the center of the second rectangular frame relative to the specified position in the video picture, wherein if the center composition mode is adopted, the specified position may be the center position of the video picture, and the position information of the photographed object defined in the specified composition can be a range where the center of the photographed object is offset from the center of the video picture. If the position offset of the center of the photographed object relative to the current video picture exceeds the defined range, the position of the video acquisition device 23 is adjusted through the gimbal to determine that the photographed object is located in the center of the video picture as much as possible.

In some embodiments, the photographed object may also be shielded, lost, or missing. For example, if the photographed object is shielded by an object, the transmitting control device 21 cannot identify the photographed object, resulting in loss of target tracking. At this time, manual adjustment may be required. Therefore, the transmitting control device 21 is also used to detect an abnormal state of the photographed object, and send abnormal prompt information to the receiving control device 22, so that the receiving control device 22 outputs the abnormal prompt information to the user, for example, the abnormal prompt information is output to a director who is monitoring remotely, so that the director can handle exceptions. The abnormal state includes the photographed objects overlap, or the photographed objects are shielded, or the photographed objects are lost. If the transmitting control device 21 cannot detect the photographed object in the video picture, that is, the features of all the extracted target objects do not match the features of the photographed object, it means that the photographed object is lost; and if it is detected that areas of the first rectangular frame and the second rectangular frame of the photographed object become smaller, the photographed object may be shielded. At this time, detection can be carried out after a certain period of time. If the abnormal state still occurs, the abnormal prompt information can be sent to the receiving control device 22 to prompt the director who is monitoring remotely to handle the abnormal situation.

In some embodiments, the transmitting control device 21 can send the acquired video data to the receiving control device 22 through the wireless transmission technology, and the receiving control device 22 can also send some human-computer interaction instructions input by the user to the transmitting control device 21. For example, in some embodiments, the receiving control device 22 can include a human-computer interaction interface, so that the received video data can be directly displayed to the user through the human-computer interaction interface. Certainly, the user can also input instructions through the human-computer interaction interface to control the transmitting control device 21.

In some embodiments, the receiving control device 22 can also be connected with the monitoring station and the video switcher to send the video data to the monitoring station, so that the director can monitor the video in the monitoring station; or receive the control instruction sent by the director through the monitoring station, and then send the control instruction to the transmitting control device 21, so that the director can remotely control the video acquisition device 23. After receiving the video data output by the receiving control device 22, the video switcher can directly perform post-production of the video. The wireless communication technology may be a wireless communication technology such as Bluetooth technology, WIFI technology and Zigbee. Certainly, considering that a transmission distance may be relatively long and the amount of the video data is relatively large, the WIFI transmission technology is usually used.

In some embodiments, the number of photographed objects is multiple. The transmitting control device 21 is also used to configure associated identifications of the multiple photographed objects, and send the associated identifications to the receiving control device 22. The associated identifications of the photographed objects include an associated identification of a main photographed object and associated identifications of other photographed objects. The receiving control device 22 is used to determine the associated identification of the main photographed object, and send the associated identification of the main photographed object to the transmitting control device 21. For example, the video picture acquired by the video acquisition device 23 may contain multiple photographed objects, the transmitting control device 21 can extract features of the multiple photographed objects, set a unique serial number for each of the multiple photographed objects according to the features of the multiple photographed objects, and then send the video data and the serial number corresponding to the photographed object in the video data to the receiving control device 22 for display to the user. After viewing the video data, the user can determine a serial number of the main photographed object, and the receiving control device 22 can send the serial number of the main photographed object determined by the user to the transmitting control device 21, so that the transmitting control device 21 can identify the main photographed object according to the associated identification of the main photographed object in the following shooting process, and then control the video acquisition device 23 to track and shoot the main photographed object.

In some embodiments, a tracked photographed object will change during shooting. For example, if there are multiple performers performing separately, a performer who is currently performing is the main photographed object, and the video acquisition device 23 can track and shoot the current performer; when the current performer finishes performing, the next performer needs to perform, and thus the current main photographed object can be replaced by the next performer, so that the video acquisition device 23 can track and shoot the next performer. The replacement of the main photographed object can be realized by a control instruction input by a user who is monitoring remotely. The transmitting control device 21 sends a tracking result or analysis result of video parameters of the current main photographed object to the receiving control device 22, so as to be displayed to the user who is monitoring remotely. The user can configure a target tracking strategy in advance through the receiving control device 22. After receiving the tracking result or analysis result sent by the transmitting control device 21, the receiving control device 22 can decide whether to replace the main photographed object according to the target tracking strategy configured by the user, and send an associated identification of a replaced main photographed object to the transmitting control device 21, so that the transmitting control device 21 can track and shoot the replaced main photographed object.

In some embodiments, after the transmitting control device 21 sends the video data to the receiving control device 22, on the one hand, the receiving control device 22 can output the video data to the video switcher, so that the video switcher can perform post-production of the video. The production of the video requires the video data to be relatively clear. On the other hand, the receiving control device 22 can also output the video data to a device of a staff such as a device of the director, which can be an independent device or an APP installed on a terminal, so that the staff can view the video. For the video data viewed by the staff, the definition of the video is not high, as long as the staff can clearly know who the current main photographed object is and whether the main photographed object is shielded or lost. Therefore, in some embodiments, before outputting the video data to the receiving control device 22, the transmitting control device 21 can also encode the video data acquired by the video acquisition device 23 into a high rate bit stream and a low rate bit stream, mark video data of the low rate bit stream, and respectively transmit video data of the high rate bit stream and the marked video data of the low rate bit stream to the receiving control device 22. The marking video data of the low rate bit stream means marking the video data with serial numbers of respective photographed objects in the video data, so that the user can control the transmitting control device 21 to replace the tracked photographed object by inputting the serial numbers after viewing the numbered video data of the photographed objects, for example, respective photographed objects in the video picture can be marked out with a callout frame, and the serial numbers can be added in the callout frame. Certainly, some parameters can also be added to the video data, for example, contrast, saturation and composition proportion, so that the user can determine whether a shooting strategy needs to be adjusted according to these parameters. The marking video data can be realized by the video encoding unit 212, and the DSP subunit 211b can send the determined serial numbers, features and video parameters of the respective photographed objects to the video encoding unit 212, so that the video encoding unit 212 can mark the video data according to the determined video parameters.

In some embodiments, the wireless transmission system can adopt a multi-transmission and multi-reception wireless transmission technology. One receiving control device 22 can be connected with multiple transmitting control devices 21 and multiple mobile terminal devices installed with APPs, and both the transmitting control devices 21 and the receiving control device 22 adopt a high-performance WIFI transmission technology. The receiving control device 22 adopts a 4*4 MIMO (multiple input multiple output) 802.11 WIFI transmission baseband, and works in the AP mode. The receiving control device 22 can set an independent SSID to manage and control a whole wireless BSS network. The receiving control device 22 can provide a sufficient transmission bandwidth, support a multi-channel high-definition video stream transmission, and reduce transmission delay. The transmitting control devices 21 and the mobile terminal devices installed with the APPs work in the station mode, wherein the transmitting control device 21 also adopts a high-performance MIMO design and supports a high-definition video stream transmission.

In some embodiments, the wireless transmission system supports and is compatible with 802.11 MU-MIMO (Multi-User Multiple-Input Multiple-Output) and WIFI WMM (WIFI multimedia), and manages priorities of different station devices and different transmission service types to ensure transmission reliability and service delay. For example, the wireless transmission system gives priority to ensuring a transmission priority of high bit stream video data of the transmitting control device 21, and adopts an enhanced bit error mechanism and a frame loss protection mechanism to ensure transmission quality and low transmission delay of the high bit stream video data. For low speed data with the highest real-time and reliability requirements, for example, CCU and gimbal control information, a burst transmission mechanism and an error correction coding mechanism are adopted, which not only ensure the transmission reliability and real-time performance, but also do not cause excessive burden on the transmission bandwidth of the wireless transmission system.

In some embodiments, the transmitting control device 21 can further include a human-computer interaction component, and the user can input human-computer interaction instructions through the human-computer interaction component to control the transmitting control device 21. For example, the transmitting control device 21 can further include a human-computer interaction interface, and the user can input control instructions through the human-computer interaction interface.

In some embodiments, the receiving control device 22 can also establish a connection with a Tally terminal, and perform data transmission. The Tally terminal can appear in the form of characters or indicator lights on system nodes such as the video acquisition device 23, a video finder of the video acquisition device 23 and a TV wall, and give visual cues to hosts and studio production staffs to coordinate a staff of each job and keep abreast of a progress of the shooting process in time.

In addition, the embodiments of the present disclosure also provide a transmitting control device. The transmitting control device can be used in the wireless transmission system in the above-mentioned embodiments, or can also be independently applied to other scenes. For example, the transmitting control device is connected with the video acquisition device, and independently controls the video acquisition device.

The transmitting control device includes a video interface unit, a processing unit, a video encoding unit and a wireless transmission unit, wherein the video interface unit is configured to connect to a video acquisition device to obtain video data acquired by the video acquisition device, the video acquisition device being external to the transmitting control device; the processing unit is configured to determine video parameters of a photographed object based on an associated identification of the photographed object and the video data, track and analyze the video parameters of the photographed object to generate a control instruction, and control the video acquisition device to acquire the video data based on the control instruction; the video encoding unit is configured to perform compression encoding on the video data acquired by the video acquisition device to obtain compression encoded video data; and the wireless transmission unit is configured to transmit the compression encoded video data to the receiving control device.

In some embodiments, the processing unit includes:
an artificial intelligence (AI) processing subunit configured to detect one or more target objects of a specified type from the video data, wherein the one or more target objects include the photographed object;
a digital signal processing (DSP) subunit configured to determine a serial number of each of the one or more target objects and video parameters of each of the one or more target objects; and
a central processing subunit configured to identify the photographed object from the one or more target objects based on a serial number of the photographed object and the serial number of each of the one or more target objects, determine the video parameters of the photographed object, analyze the video parameters of the photographed object to generate a control instruction, and control the video acquisition device to acquire the video data based on the control instruction.

In some embodiments, the serial number of each of the target objects is determined based on at least one of: a binding relationship between the serial number of the target object and features of the target object, or dynamic position information of the target object.

In some embodiments, the features of the target object include at least one of: head features of the target object, body features of the target object, or pixel features of an image area corresponding to the target object, wherein the pixel features are obtained based on a chromaticity of pixel points in the image area, a brightness of the pixel points and a contour of the image area.

In some embodiments, the video parameters of the photographed object include at least one of: position parameters of the photographed object, or image quality parameters of the photographed object.

In some embodiments, the video encoding unit is further configured to encode the video data acquired by the video acquisition device into a high rate bit stream and a low rate bit stream, and mark video data of the low rate bit stream; and
the wireless transmission unit is further configured to transmit video data of the high rate bit stream and the marked video data of the low rate bit stream to the receiving control device, receive the associated identification of the photographed object sent by the receiving control device, and send the associated identification of the photographed object to the central processing subunit.

In some embodiments, the video encoding unit, the central processing subunit, the AI processing subunit and the DSP subunit are four independent functional units or integrated on one chip.

In some embodiments, the transmitting control device further includes a video processing unit configured to receive the video data from the video interface unit, and process and output the video data to the AI processing subunit.

In some embodiments, the central processing subunit is configured to send the control instruction to a controlled device, so that the video acquisition device is controlled by the controlled device to acquire the video data.

In some embodiments, the controlled device includes a camera control unit (CCU), the transmitting control device includes a CCU extended control interface connected to the central processing subunit, and the central processing subunit is connected to the CCU through the CCU extended control interface.

In some embodiments, the controlled device includes a gimbal on which the video acquisition device is mounted.

In certain embodiments, the gimbal includes a motor motion control unit, a horizontal servo motor drive unit and a vertical servo motor drive unit connected to the motor motion control unit, wherein the motor motion control unit is connected to the central processing subunit to receive the control instruction from the central processing subunit, the control instruction is used to indicate the motor motion control unit to control the horizontal servo motor drive unit to drive the video acquisition device to rotate in a horizontal plane, and to control the vertical servo motor drive unit to drive the video acquisition device to roll in a vertical plane.

In some embodiments, the controlled device and the transmitting control device are configured to be one of physically integrated into a whole piece, or disposed independently of each other.

In some embodiments, the number of video channels of the video interface unit corresponds to the number of video channels of the video acquisition device.

Specific functional details and implementation manner of the transmitting control device can refer to the description in the above-mentioned wireless transmission system, which is not repeated here.

In order to further explain the wireless transmission system provided by the embodiments of the present disclosure, a specific embodiment is used to explain below.

For a shooting of some large-scale activities, multiple camera devices are usually arranged at different positions to shoot a site of the activities from different angles. Video data acquired by the camera devices can be transmitted to different video receiving ends, so that users can view the acquired video data. For example, the video receiving ends may be monitoring stations or video switchers, so that a director who is monitoring remotely can adjust a shooting strategy according to a video effect. In addition, the video receiving ends may also be user's personal terminals, so that the user can directly view videos through the personal terminals. In the related art, each of the camera devices is usually equipped with a photographer, so that the camera device can be controlled by the photographer to track and control the photographed object; meanwhile, the director is also equipped to remotely monitor photographed videos and make corresponding adjustments. In order to reduce manpower consumption, the embodiments of the present disclosure provide a wireless transmission system, which can control the camera devices to automatically track and shoot the photographed object without the photographer. Meanwhile, the director can also remotely control the camera devices, thereby realizing that multiple video acquisition devices can be controlled by one person, and greatly saving the manpower.

Figure 13:
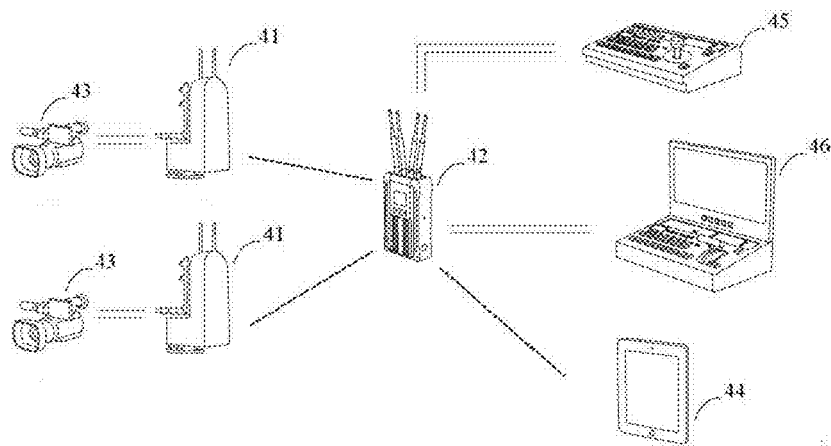
FIG. 13 is a schematic diagram illustrating a shooting application scene according to an embodiment of the present disclosure.

FIG. 13 is a schematic diagram illustrating an application scene according to an embodiment of the present disclosure. The wireless transmission system includes a transmitting control device 41 and a receiving control device 42, wherein the transmitting control device 41 and the receiving control device 42 are configured to be wirelessly connected, wherein the number of the transmitting control device 41 can be one or more, and two is taken as an example in FIG. 13. The transmitting control device 41 is connected with a camera device 43 through a physical interface to obtain video data collected by the camera device 43, and then sends the video data to the receiving control device 42. The receiving control device 42 can be connected to a monitoring station 45 and a video switcher 46, and can send the video data to the monitoring station 45, so that a director can monitor a video through the monitoring station 45. Meanwhile, the director can also send a control instruction through the monitoring station 45 to control the camera device 43. The receiving control device 42 can send the video data to the video switcher 46 for later production or processing of the video data. In addition, the receiving control device 42 can also be configured to be wirelessly connected to a video receiving end 44. The video receiving end 44 can be an APP installed on a terminal device, and the APP can receive the video data from the receiving control device 42 and display the video data to a user. Meanwhile, the video receiving end 44 can also receive a control instruction input by the user through the APP to control the camera device 43. The transmitting control device 41, the receiving control device 42 and the video receiving end 44 can be connected through a WIFI channel, the receiving control device 42 works in an AP mode, and the transmitting control device 41 and the video receiving end 44 work in a Station mode.

Internal structures and working flows of the transmitting control device 41 and the receiving control device 42 are respectively described below.

1. Transmitting Control Device 41

Figure 14:
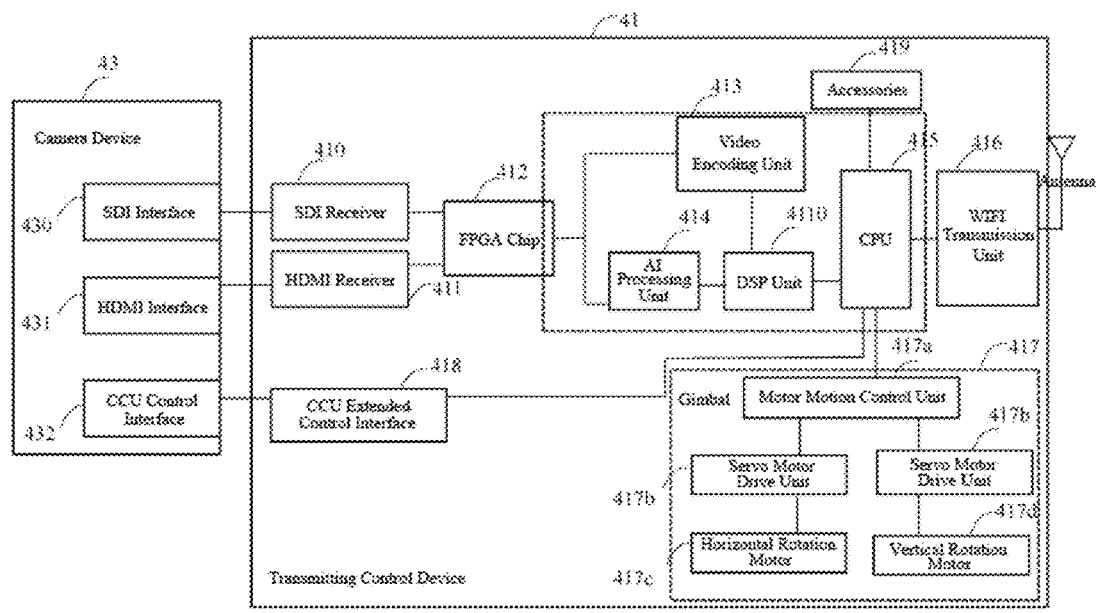
FIG. 14 is a schematic structural diagram illustrating a transmitting control device according to an embodiment of the present disclosure.

FIG. 14 is a schematic structural diagram illustrating a transmitting control device 41. A processing flow of the transmitting control device 41 will now be described with reference to FIG. 14.

An interface circuit part of the transmitting control device 41 includes an SDI receiver 410, an HDMI receiver 411 and an FPGA chip 412, wherein the FPGA chip 412 is used for processing video signals and selecting buses. The camera device 43 outputs SDI and HDMI standard video interface signals through an SDI interface 430 and an HDMI interface 431, and converts the SDI and HDMI standard video interface signals into standard digital parallel videos through the SDI receiver 410 and the HDMI receiver 411, wherein a format of the SDI and HDMI standard video interface signals is BT1120 or MIPI; further, the standard digital parallel videos are sent to a back end FPGA chip 412 to process the video signals such as format conversion, and then one video signal is selected to be sent to a subsequent AI processing unit 414. The camera device 43 further includes a CCU control interface 432, through which the camera device 43 can receive the CCU control signal from the CCU extended control interface in the transmission control device 41.

The AI processing unit 414 is mainly used to identify one or more target objects of a specified type in video images. For example, if a photographed object is a person, all humanoid targets in the video images are identified, and the identified humanoid targets are sent to a DSP unit 4110. The DSP unit 4110 is mainly used to extract features of the humanoid targets, determine image quality parameters and position parameters of respective humanoid targets, and set serial numbers for the respective humanoid targets, wherein the serial numbers are bound to the features of the respective humanoid targets. For continuous multi-frame video images, the DSP unit 4110 can determine the serial number of the humanoid target in each frame of the video images according to the humanoid targets identified by the AI processing unit 414, extract the features of the humanoid target, and determine video parameters such as dynamic position information, image quality parameters, and a proportion of the humanoid target in the video pictures. Further, the DSP unit 4110 sends the video parameters to a video encoding unit 413 and a CPU 415 in the form of a data table, and the CPU 415 can set initial parameters of an algorithm at the same time.

After receiving the video signals output by the FPGA chip 412, the video encoding unit 413 performs compression encoding on the video signals, wherein the video encoding unit 413 has a capability of simultaneously encoding with high-low dual bit streams. Content videos are produced with a high bit stream compression to ensure that video quality metrics meet requirements of live broadcast production, for example, videos output to the video switcher 46 can be encoded with the high bit stream. A low bit stream is used for auxiliary monitoring, which has a relatively low video quality expectation and is mainly used for user interaction, for example, videos output to the monitoring station 45 and the video receiving end 44 can be encoded with the low bit stream. The video encoding unit 413 can mark the video images according to the data table output by the DSP unit 4110, for example, a rectangular frame is used to mark out humanoid targets in the video images and added with serial numbers and marking parameters; further, the marked video are to be suppressed a low bit stream compression for user interaction and monitoring.

The CPU 415 is mainly used for the management, control, interface expansion, business function realization, user interaction function realization of all functional units and power management. For example, the CPU 415 can receive the serial number of the photographed object input by the user from the receiving control device 42, determine the photographed object from the humanoid targets according to the serial numbers of the respective humanoid targets in the data table and the received serial number of the photographed object, and determine the video parameters such as the dynamic position information and image quality parameters of the photographed object and the proportion of the photographed object in the video picture. Further, the CPU 415 compares the video parameters with parameters defined in a preset composition mode, and generates a control instruction according to a result from the comparing to control the camera device 43. For example, the camera device 43 can be controlled through a CCU extended control interface 418 to realize on/off controlling, aperture adjustment, focus adjustment and recordation controlling for the camera device 43. The transmitting control device 41 further includes a gimbal 417 on which the camera device 43 is mounted. The gimbal 417 includes a motor motion control unit 417a, a servo motor drive unit 417b, a horizontal rotation motor 417c and a vertical rotation motor 417d. The CPU 415 can also control the servo motor drive unit 417b through the motor motion control unit 417 according to an output result of the AI processing unit 414 to drive the horizontal rotation motor 417c and the vertical rotation motor 417d to rotate, so that the camera device 43 is driven to move to track and shoot the photographed object.

A WIFI transmission unit 416 is mainly used to transmit video bit streams, gimbal control signals and CCU control signals, and usually adopts a MIMO multi-antenna technology to make a transmission bandwidth and a transmission distance meet requirements of live video applications. After encoding the video signals with the high-low dual bit streams, the video encoding unit 413 sends the encoded video signals to the WIFI transmission unit 416, and the WIFI transmission unit 416 transmits the encoded video signals to the receiving control device 42 through an antenna. The WIFI transmission unit 416 can also receive control instructions sent by the receiving control device 42 and input by the user through the monitoring station 45 and the video switcher 46, and then send the control instructions to the CPU 415, so that the CPU 415 can control the gimbal and the CCU.

The transmitting control device 41 further includes other accessories 419. The other accessories 419 include Tally lamps, buttons, LCD screens, power supply and battery management circuits, antennas, housings, installation accessories, and the like.

In practical implementation, the above-mentioned AI processing unit 414, the DSP unit 4110, the video encoding unit 413 and the CPU 415 may be discrete chips or modules, or may be highly integrated separate chips with related capabilities.

2. Receiving Control Device 42

Figure 15:
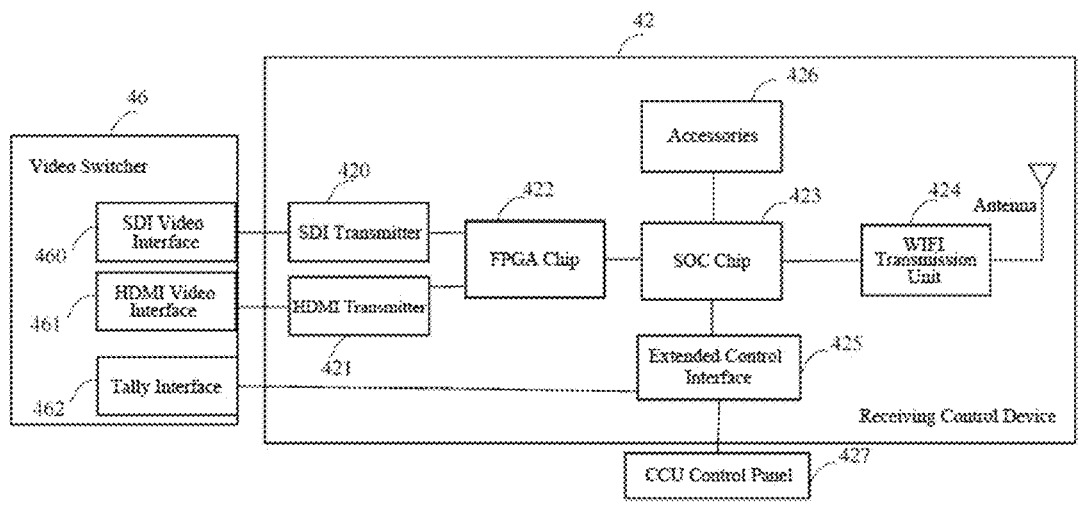
FIG. 15 is a schematic structural diagram illustrating a receiving control device according to an embodiment of the present disclosure.

FIG. 15 is a schematic structural diagram illustrating a receiving control device 42. A processing flow of the receiving control device 42 will now be described with reference to FIG. 15.

A WIFI transmission unit 424 of the receiving control device 42, as a network center control unit, can keep a wireless communication connection with multiple transmitting control devices 41 and the video receiving end 44, and transmit the low bit stream from the transmitting control device 41 to the video receiving end 44.

After receiving the video data, the WIFI transmission unit 424 sends the video data to an SOC (System on Chip) chip 423. The SOC chip 423 is used to perform decompression decoding on the video data, since the SOC chip 423 has a multi-channel decoding capability, videos with the high bit stream sent by the multiple transmitting control devices 41 can be simultaneously decoded. The decoded videos are output through an FPGA chip 422, wherein the FPGA chip 422 can output the video data in multiple channels. The SOC chip 423 is also used to manage all system applications and user applications including network and video. In some embodiments, the SOC chip 423 may be an integrated chip that integrates CPU and H264/H265 codec functions.

The FPGA chip 422 performs format conversion, image enhancement, auxiliary data and parallel video bus distribution on digital video signals, and outputs the digital video signals to an SDI video interface 460 and an HDMI video interface 461 of the video switcher 46 through an SDI transmitter 420 and an HDMI transmitter 421, wherein the number of channels of a video interface circuit corresponds to the number of video transmitting ends.

In addition, the SOC chip 423 is connected to a Tally interface 462 of the video switcher 46 and a CCU control panel 427 through an extended control interface 425 to receive Tally control signals and CCU control signals and send the Tally control signals and CCU control signals to the transmitting control device 41.

The receiving control device 42 further includes accessories 426, and the accessories 426 include buttons, LCD screens, power supply and battery management circuits, antennas, housings, installation accessories, and the like.

The video receiving end 44 runs a dedicated APP to mainly realize the following functions:

1. The APP can decode videos with the low bit stream, cooperate with related software to analyze the videos, and can be used as a mobile monitoring terminal.

2. The decoded videos can be superimposed with a processing sign of the AI processing unit, so that the user can easily observe processing results of the AI processing unit; meanwhile, the user can set and adjust the parameters of the algorithm executed by the AI processing unit, and can interact with the AI processing unit, for example, the user can select the photographed object from the multiple target objects.

3. The APP can also integrate a camera CCU control function, so that the user can wirelessly remotely control the camera devices and set and adjust parameters of a CCU control algorithm.

4. The APP can also integrate a gimbal control function, so that the user can wirelessly remotely control the gimbal and set and adjust parameters of a gimbal control algorithm.

The wireless transmission system provided by the embodiments of the present disclosure has the following advantages:

1. There is provided a wireless transmission system for professional shooting scenes, the wireless transmission system can integrate an AI recognition and target tracking technology, a wireless high-definition video transmission technology, a gimbal motor servo control technology and a camera CCU control technology to realize automatic tracking and shooting of the photographed object, thereby, effectively reducing manpower investment in the shooting scene, and saving the shooting cost.

2. The wireless transmission system can support multi-transmission and multi-reception wireless network configurations, that is, the wireless transmission system can meet application requirements of automatic shooting of multiple camera devices, wireless transmission of multi-channel video data, on-site production and multi-person monitoring.

3. The wireless transmission system can also support an APP installed on a mobile intelligent terminal for video monitoring and can support the APP for human-computer interaction, so that the user can quickly and conveniently control the shooting scene.

The various technical features in the above embodiments can be combined arbitrarily, as long as there is no conflict or contradiction between the combinations of features. Due to space limitations, the combinations of features are not described one by one. Therefore, the various technical features in the above embodiments combined arbitrarily also belong to the scope of the present disclosure.

Those skilled in the art will easily think of other embodiments of the present disclosure after considering the specification and practicing the present disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as being exemplary only, and the true scope and spirit of the present disclosure are specified by the following claims.

It will be appreciated that the present disclosure is not limited to the exact construction that has been described above and illustrated in the accompanying drawings, and that various modifications and changes can be made without departing from the scope thereof. It is intended that the scope of the present disclosure shall only be limited by the appended claims.

The above are only the embodiments of the present disclosure and are not used to limit the present disclosure. Any modification, equivalent replacement, improvement, etc. made within the spirit and principle of the present disclosure may be included in the protection scope of the present disclosure.

The invention claimed is:

1. A wireless transmission system, comprising:
a transmitting control device; and
a receiving control device,
wherein the transmitting control device is configured to:
be connected to a video acquisition device to obtain video data acquired by the video acquisition device, the video acquisition device being external to the transmitting control device,
determine video parameters of a photographed object based on an associated identification of the photographed object and the video data,
track and analyze the video parameters of the photographed object to generate a control instruction, and
control the video acquisition device to acquire the video data based on the control instruction,
perform compression encoding on the video data acquired by the video acquisition device to obtain compression encoded video data, and
transmit the compression encoded video data to the receiving control device; and
wherein the receiving control device is configured to:
determine the associated identification of the photographed object, and
send the associated identification to the transmitting control device, and
receive and output the compression encoded video data transmitted by the transmitting control device.

2. The wireless transmission system according to claim 1, wherein the transmitting control device is configured to:
detect one or more target objects of a specified type from the video data, wherein the one or more target objects comprise the photographed object;
determine a serial number of each of the one or more target objects and video parameters of each of the one or more target objects;
identify the photographed object from the one or more target objects based on a serial number of the photographed object and the serial number of each of the one or more target objects;
determine the video parameters of the photographed object;
analyze the video parameters of the photographed object to generate the control instruction; and
control the video acquisition device to acquire the video data based on the control instruction.

3. The wireless transmission system according to claim 2, wherein the serial number of each of the one or more target objects is determined based on at least one of:
a binding relationship between the serial number of the target object and features of the target object, or
dynamic position information of the target object.

4. The wireless transmission system according to claim 2, wherein the transmitting control device is further configured to:
encode the video data acquired by the video acquisition device into a high rate bit stream and a low rate bit stream, mark video data of the low rate bit stream,
transmit video data of the high rate bit stream and the marked video data of the low rate bit stream to the receiving control device, and
receive the associated identification of the photographed object sent by the receiving control device.

5. The wireless transmission system according to claim 2, wherein the transmitting control device is configured to send the control instruction to a controlled device, such that the video acquisition device is controlled by the controlled device to acquire the video data.

6. The wireless transmission system according to claim 5, wherein the controlled device comprises a camera control unit (CCU), the transmitting control device comprises a CCU extended control interface, and the transmitting control device is configured to be connected to the CCU through the CCU extended control interface.

7. The wireless transmission system according to claim 5, wherein the controlled device comprises a gimbal on which the video acquisition device is mounted.

8. The wireless transmission system according to claim 5, wherein the controlled device and the transmitting control device are configured to be one of
physically integrated into a whole piece, or
disposed independently of each other.

9. The wireless transmission system according to claim 1, wherein the video parameters comprise at least one of position parameters or image quality parameters.

10. The wireless transmission system according to claim 1, wherein the receiving control device is configured to:
perform decompression decoding on received video data, wherein the received video data comprises single-channel video data or multi-channel video data, and
output decompression decoded video data.

11. The wireless transmission system according to claim 1, wherein a number of video channels of the transmitting control device corresponds to a number of video channels of the video acquisition device.

12. A transmitting control device, comprising:
at least one processor; and
at least one memory coupled to the at least one processor and storing programming instructions for execution by the at least one processor to:
connect to a video acquisition device to obtain video data acquired by the video acquisition device, the video acquisition device being external to the transmitting control device,
determine video parameters of a photographed object based on an associated identification of the photographed object and the video data,
track and analyze the video parameters of the photographed object to generate a control instruction,
control the video acquisition device to acquire the video data based on the control instruction,
perform compression encoding on the video data acquired by the video acquisition device to obtain compression encoded video data, and
transmit the compression encoded video data to a receiving control device that is wirelessly connected to the transmitting control device, and
wherein the transmitting control device is configured to:
detect one or more target objects of a specified type from the video data, wherein the one or more target objects comprise the photographed object;
determine a serial number of each of the one or more target objects and video parameters of each of the one or more target objects,
identify the photographed object from the one or more target objects based on a serial number of the photographed object and the serial number of each of the one or more target objects to determine the video parameters of the photographed object,
analyze the video parameters of the photographed object to generate the control instruction, and
control the video acquisition device to acquire the video data based on the control instruction.

13. The transmitting control device according to claim 12, wherein the serial number of the target object is determined based on at least one of:
a binding relationship between the serial number of the target object and features of the target object, or
dynamic position information of the target object.

14. The transmitting control device according to claim 12, wherein the transmitting control device is further configured to:
encode the video data acquired by the video acquisition device into a high rate bit stream and a low rate bit stream,
mark video data of the low rate bit stream,
transmit video data of the high rate bit stream and the marked video data of the low rate bit stream to the receiving control device, and
receive the associated identification of the photographed object sent by the receiving control device.

15. The transmitting control device according to claim 12, wherein the transmitting control device is further configured to:
receive the video data from the transmitting control device, and
process and output the video data to the transmitting control device.

16. The transmitting control device according to claim 12, wherein the transmitting control device is configured to send the control instruction to a controlled device, such that the video acquisition device is controlled by the controlled device, and
wherein the controlled device comprises a camera control unit (CCU), the transmitting control device comprises a CCU extended control interface, and the transmitting control device is configured to be connected to the CCU through the CCU extended control interface.

17. The transmitting control device according to claim 12, wherein the video parameters of the photographed object comprise at least one of:
position parameters of the photographed object, or
image quality parameters of the photographed object.

18. An apparatus comprising:
at least one processor; and
at least one memory coupled to the at least one processor and storing programming instructions for execution by the at least one processor to perform operations comprising:
obtaining video data acquired by a video acquisition device;
determining video parameters of a photographed object based on an associated identification of the photographed object and the video data;
tracking and analyzing the video parameters of the photographed object to generate a control instruction,
controlling the video acquisition device to acquire the video data based on the control instruction;

performing compression encoding on the video data acquired by the video acquisition device to obtain compression encoded video data; and transmitting the compression encoded video data to a receiving control device;

wherein the operations comprise:

detecting one or more target objects of a specified type from the video data wherein the one or more target objects comprise the photographed object;

determining a serial number of each of the one or more target objects and video parameters of each of the one or more target objects;

identifying the photographed object from the one or more target objects based on a serial number of the photographed object and the serial number of each of the one or more target objects to determine the video parameters of the photographed object;

analyzing the video parameters of the photographed object to generate the control instruction; and controlling the video acquisition device to acquire the video data based on the control instruction.

\* \* \* \* \*